United States Patent
Seo et al.

(10) Patent No.: US 12,236,653 B2
(45) Date of Patent: Feb. 25, 2025

(54) VISION SENSORS, IMAGE PROCESSING DEVICES INCLUDING THE VISION SENSORS, AND OPERATING METHODS OF THE VISION SENSORS

(71) Applicant: Samsung Electronics Co., Ltd., Suwon-si (KR)

(72) Inventors: Jongseok Seo, Seoul (KR); Hyunku Lee, Suwon-si (KR); Heejae Jung, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/653,271

(22) Filed: May 2, 2024

(65) Prior Publication Data

US 2024/0282070 A1    Aug. 22, 2024

Related U.S. Application Data

(60) Continuation of application No. 18/341,968, filed on Jun. 27, 2023, now Pat. No. 12,002,247, which is a
(Continued)

(30) Foreign Application Priority Data

Jun. 26, 2019   (KR) .......................... 10-2019-0076347

(51) Int. Cl.
*G06V 10/147* (2022.01)
*G06F 18/243* (2023.01)
(Continued)

(52) U.S. Cl.
CPC .......... *G06V 10/147* (2022.01); *G06F 18/243* (2023.01); *G06T 5/70* (2024.01);
(Continued)

(58) Field of Classification Search
CPC ...... G06V 10/147; G06V 10/22; G06V 10/25; G06V 20/52; G06V 10/10; G06V 20/44;
(Continued)

(56) References Cited

U.S. PATENT DOCUMENTS 9,934,557 B2   4/2018   Ji et al.
10,198,660 B2  2/2019   Ji et al.
(Continued)

FOREIGN PATENT DOCUMENTS

CN   106488151 A   3/2017
CN   108697314 A   10/2018
(Continued)

OTHER PUBLICATIONS

Korean Office Action dated Jan. 17, 2024 for corresponding Korean Application No. 10-2019-0076347.
(Continued)

*Primary Examiner* — Michael S Osinski
(74) *Attorney, Agent, or Firm* — Harness, Dickey & Pierce, P.L.C.

(57) ABSTRACT

A vision sensor includes a pixel array comprising pixels arranged in a matrix, an event detection circuit, an event rate controller, and an interface circuit. Each pixel is configured to generate an electrical signal in response to detecting a change in incident light intensity. The event detection circuit detects whether a change in incident light intensity has occurred at any pixels, based on processing electrical signals received from one or more pixels, and generates one or more event signals corresponding to one or more pixels at which a change in intensity of incident light is determined to have occurred. The event rate controller selects a selection of one or more event signals corresponding to a region of interest on the pixel array as one or more output event signals. The interface circuit communicates with an external processor to
(Continued)

transmit the one or more output event signals to the external processor.

20 Claims, 25 Drawing Sheets

Related U.S. Application Data continuation of application No. 18/059,469, filed on Nov. 29, 2022, now Pat. No. 11,727,662, which is a division of application No. 16/843,231, filed on Apr. 8, 2020, now Pat. No. 11,532,143.

(51) Int. Cl.
| | | |
|---|---|---|
| *G06T 5/70* | (2024.01) | |
| *G06T 7/20* | (2017.01) | |
| *G06T 7/70* | (2017.01) | |
| *G06V 10/22* | (2022.01) | |
| *G06V 10/25* | (2022.01) | |
| *H04N 23/667* | (2023.01) | |
| *H04N 23/80* | (2023.01) | |

(52) U.S. Cl.
CPC .............. *G06T 7/20* (2013.01); *G06T 7/70* (2017.01); *G06V 10/22* (2022.01); *G06V 10/25* (2022.01); *H04N 23/667* (2023.01); *H04N 23/80* (2023.01)

(58) Field of Classification Search
CPC ...... G06V 10/764; G06V 20/00; G06V 40/28; G06F 18/243; G06F 3/017; G06F 3/0304; G06T 5/002; G06T 7/20; G06T 7/70; G06T 2207/10016; G06T 2207/10048; G06T 2207/30232; G06T 7/246; G06T 7/254; G06T 7/269; H04N 23/667; H04N 23/80; H04N 23/61; H04N 25/40; H04N 25/00; H04N 25/70; H04N 25/42; H04N 25/585; H04N 25/75; H04N 25/77; H04N 25/79; H04N 25/771; H04N 25/772; H04N 25/443; H04N 25/50; H04N 23/71; H04N 23/73; H04N 25/59; H04N 25/60; H04N 25/74; H04N 23/60; H04N 25/53; H04N 25/445; H04N 25/745
See application file for complete search history.

(56) References Cited

U.S. PATENT DOCUMENTS

| | | |
|---|---|---|
| 10,346,506 B2 | 7/2019 | Park et al. |
| 10,531,031 B2 | 1/2020 | Park et al. |
| 11,317,045 B2 | 4/2022 | Posch et al. |
| 2014/0022158 A1 | 1/2014 | Lee et al. |
| 2014/0023235 A1 | 1/2014 | Cennini et al. |
| 2014/0313320 A1 | 10/2014 | Kikuchi |
| 2015/0007217 A1 | 1/2015 | Wood |
| 2015/0054973 A1 | 2/2015 | Velichko |
| 2015/0294163 A1 | 10/2015 | Sakamoto |
| 2015/0319369 A1 | 11/2015 | Serrano Gotarredona et al. |
| 2015/0371374 A1 | 12/2015 | Zeng et al. |
| 2016/0005182 A1 | 1/2016 | Ashani |
| 2016/0127655 A1 | 5/2016 | Li et al. |
| 2016/0171338 A1 | 6/2016 | Mine et al. |
| 2016/0267623 A1 | 9/2016 | Heo |
| 2016/0274643 A1 | 9/2016 | Liu et al. |
| 2017/0032536 A1 | 2/2017 | Lee et al. |
| 2017/0059399 A1 | 3/2017 | Suh et al. |
| 2017/0078648 A1 | 3/2017 | Saunders |
| 2017/0213105 A1 | 7/2017 | Ji et al. |
| 2018/0032150 A1 | 2/2018 | Lee et al. |
| 2018/0039601 A1 | 2/2018 | Park et al. |
| 2018/0137379 A1 | 5/2018 | Oki |
| 2018/0143701 A1 | 5/2018 | Suh et al. |
| 2018/0189959 A1 | 7/2018 | Berner et al. |
| 2018/0191972 A1 | 7/2018 | Berner et al. |
| 2018/0262665 A1 | 9/2018 | Jung et al. |
| 2018/0262705 A1 | 9/2018 | Park et al. |
| 2018/0285650 A1 | 10/2018 | George et al. |
| 2019/0007678 A1 | 1/2019 | Perez-Ramirez et al. |
| 2019/0014258 A1 | 1/2019 | Horesh |
| 2019/0191120 A1 | 6/2019 | Ikedo |
| 2020/0162691 A1 | 5/2020 | Mori et al. |
| 2020/0219267 A1 | 7/2020 | Rebecq et al. |
| 2020/0244931 A1 | 7/2020 | Yao et al. |
| 2020/0256991 A1 | 8/2020 | Kim et al. |
| 2020/0260052 A1 | 8/2020 | Hutchinson et al. |
| 2020/0278539 A1 | 9/2020 | Petljanski et al. |
| 2021/0037202 A1 | 2/2021 | Chen |
| 2021/0042938 A1 | 2/2021 | Chen et al. |
| 2021/0084242 A1 | 3/2021 | Moriya |
| 2021/0084288 A1 | 3/2021 | Sakakibara |
| 2021/0152757 A1 | 5/2021 | Wakabayashi |
| 2021/0218913 A1 | 7/2021 | Xiao et al. |
| 2021/0227116 A1 | 7/2021 | Kaizu |
| 2021/0281734 A1 | 9/2021 | Yamamoto et al. |
| 2021/0360184 A1 | 11/2021 | Jakobson et al. |
| 2021/0368123 A1 | 11/2021 | Watanabe et al. |
| 2022/0030185 A1 | 1/2022 | Honda et al. |
| 2022/0109799 A1 | 4/2022 | Niwa et al. |
| 2022/0232176 A1 | 7/2022 | Naganuma |

FOREIGN PATENT DOCUMENTS

| | | |
|---|---|---|
| JP | H06195441 A | 7/1994 |
| KR | 10-1530851 B1 | 6/2015 |
| KR | 10-2015-0082972 A | 7/2015 |
| KR | 10-2017-0014491 A | 2/2017 |
| KR | 10-2017-0122425 A | 11/2017 |
| KR | 10-2018-0056962 A | 5/2018 |
| KR | 10-2018-0068720 A | 6/2018 |
| KR | 10-2018-0102988 A | 9/2018 |

OTHER PUBLICATIONS

Chinese Office Action dated Jan. 19, 2024 for corresponding Chinese Application No. 202010526059.X.
Li Tian-ze et al., "Research of a novel architecture of a 2D digital array working as position sensitive detector", Opto-Electronic Engineering, vol. 34, No. 1, Jan. 2007.
Chinese Office Action dated Jun. 27, 2024 for corresponding Chinese Application No. 202010526059.X.

< Packet >

< Frame >

VISION SENSORS, IMAGE PROCESSING DEVICES INCLUDING THE VISION SENSORS, AND OPERATING METHODS OF THE VISION SENSORS

CROSS-REFERENCE TO RELATED APPLICATIONS

This application is a continuation of U.S. application Ser. No. 18/341,968, filed Jun. 27, 2023, which is a continuation of U.S. application Ser. No. 18/059,469, filed Nov. 29, 2022, which is a divisional of U.S. application Ser. No. 16/843, 231, filed Apr. 8, 2020, which claims the benefit of Korean Patent Application No. 10-2019-0076347, filed on Jun. 26, 2019, in the Korean Intellectual Property Office, the disclosure of each of which is incorporated herein in its entirety by reference.

BACKGROUND

The inventive concepts relate to vision sensors, and more particularly, to vision sensors that are configured to adjust an amount of event data that is transmitted, image processing devices including the vision sensors, and operating methods of the vision sensors.

When an event (for example, change in intensity of light incident on a vision sensor) occurs, a vision sensor, for example, a dynamic vision sensor, generates information regarding (e.g., associated with) the event, that is, an event signal, and provides the event signal to a processor. As a change in intensity of light (e.g., incident light) mainly occurs at an outline of an object that is being detected by the vision sensor, the vision sensor does not generate unnecessary information regarding a background, and an amount of data to be processed by a processor may be rapidly reduced. In addition, when a large amount (e.g., quantity, count, etc.) of events occurs during a long time period and an amount of event data (e.g., event signals indicating the occurrence of said events) to be transmitted to the processor exceeds a transmission limit of a system, data loss may occur in a process of transmitting the event data.

SUMMARY

Some example embodiments of the inventive concepts provide one or more vision sensors that are each configured to reduce or prevent data loss in a process of transmitting event data by said one or more vision sensors, one or more image processing devices including the one or more vision sensors, and one or more operating methods of the one or more vision sensors.

According to some example embodiments, a vision sensor may include a pixel array comprising a plurality of pixels arranged in a matrix, each pixel configured to generate a separate electrical signal in response to detecting a change in intensity of incident light. The vision sensor may include an event detection circuit configured to detect whether a change in intensity of incident light has occurred at any of the plurality of pixels, based on processing electrical signals received from one or more pixels of the plurality of pixels, and generate one or more event signals corresponding to one or more pixels, of the plurality of pixels, at which a change in intensity of incident light is determined to have occurred, respectively. The vision sensor may include an event rate controller configured to select, from among the one or more event signals, one or more event signals corresponding to a region of interest on the pixel array as one or more output event signals. The vision sensor may include an interface circuit configured to communicate with an external processor and transmit the one or more output event signals to the external processor.

According to some example embodiments, an image processing device may include a vision sensor configured to capture an image of an object, generate a plurality of event signals corresponding to a plurality of pixels included in a pixel array, each event signal being generated based on movement of the object in relation to the vision sensor, and selectively transmit all of the plurality of event signals or a limited selection of event signals of the plurality of event signals as one or more output event signals in response to the vision sensor operating in a selected operation mode of a first operation mode or a second operating mode, respectively, the limited selection of event signals corresponding to one or more pixels of the plurality of pixels included in a region of interest of the pixel array. The image processing device may further include a processor configured to process the one or more output event signals to detect the movement of the object.

According to some example embodiments, a method of operating a vision sensor may include defining at least one region of interest on a pixel array including a plurality of pixels, each pixel of the plurality of pixels configured to generate an event signal in response to a change in an intensity of light received by the pixel. The method may include detecting an amount of event signals that are generated in a particular first time period by counting a plurality of event signals generated during the particular first time period. The method may include selectively controlling the vision sensor to operate in a selected operation mode based on a determination that the amount of event signals that are generated in the particular first time period is equal to or greater than a threshold value. The method may include transmitting a limited selection of event signals from among the plurality of event signals to an external processor based on the vision sensor operating the in the selected operation mode, the limited selection of event signals corresponding to the at least one region of interest.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Figure 1:
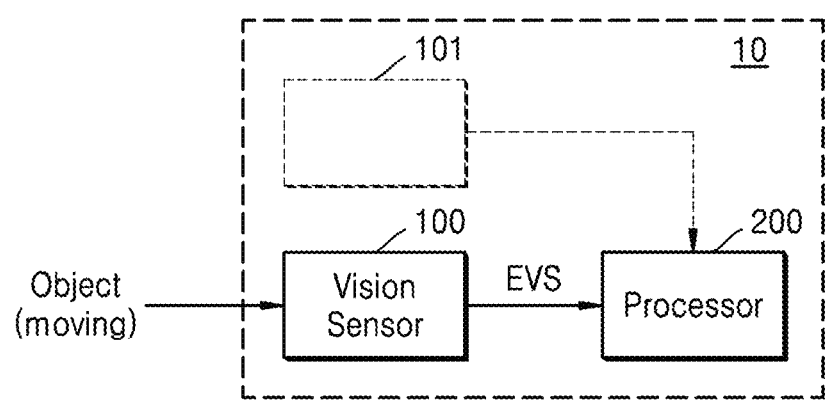
FIG. 1 is a block diagram of an image processing device according to some example embodiments of the inventive concepts.

FIG. 1 is a block diagram of an image processing device according to some example embodiments of the inventive concepts.

The image processing device 10 according to some example embodiments of the inventive concepts may be mounted in (e.g., may be included in) an electronic device that has (e.g., is configured to perform) an image sensing function and/or light sensing function. For example, the image processing device 10 may be mounted in an electronic device such as a camera, a smart phone, an Internet of Things (IoT) device, a tablet personal computer (PC), a personal digital assistant (PDA), a portable multimedia player (PMP), a navigation device, a drone, and an advanced drivers assistant system (ADAS). In addition, the image processing device 10 may be provided as an element in vehicles, furniture, manufacturing device, doors, various measuring devices, and the like.

Referring to FIG. 1, the image processing device 10 may include a vision sensor 100 and a processor 200.

The vision sensor 100, which may be referred to interchangeably as an image sensor and/or light sensor, may generate an electrical signal in response to detecting and/or absorbing at least a portion of light that is incident on at least a portion of the vision sensor 100. The vision sensor 100 may include an array of pixels (e.g., pixel array), where each pixel in the array is configured to separately receive and sense (e.g., detect, absorb, etc.) incident light. To sense incident light, a pixel may be configured to output (e.g., generate, transmit, etc.) an electrical signal in response to receiving, absorbing, etc. said incident light. In some example embodiments, the electrical signals output by the pixels of the pixel array of the vision sensor 100 may be processed to generate an image of an external scene, including an image of an object within said scene, where the electrical signal(s) output from each pixel of the pixel array of the vision sensor 100 are used to generate a corresponding pixel of the generated image. Said processing to generate the image may be performed by the vision sensor 100, by the processor 200 based on said signals generated by the pixels of the vision sensor 100 being transmitted to the processor 200, any combination thereof, or the like. In this manner, a scene and/or an object in the scene may be "imaged" by the vision sensor 100 and/or the image processing device 10.

In some example embodiments, the image processing device 10 and/or an electronic device in which the image processing device 10 is included may include a separate vision sensor 100 that is used to generate one or more images of a scene and/or object, separately from a vision sensor 100 that operates as a dynamic vision sensor. For example, the vision sensor 100 of the image processing device 10 of FIG. 1 may only transmit event signals EVS to the processor 200, while a separate vision sensor 101 may include a separate pixel array and may generate and/or transmit signals that may be processed to generate an image of an external scene and/or object.

The vision sensor 100 may sense a change in intensity of incident light and may output (e.g., generate, transmit, etc.) one or more event signals (EVS) in response to sensing said change. The vision sensor 100 may include a dynamic sensor that outputs (e.g., generates, transmits, etc.) event signals EVS corresponding to pixels of the vision sensor 100 at which a change in incident light thereon is detected, that is, the pixels in/at which events occurred (e.g., pixels of a pixel array of the vision sensor 100 at which the intensity of incident light on said pixels has changed). Change in the intensity of incident light at a pixel may result from movement of an object that is captured (e.g., imaged) by the pixel array of the vision sensor 100, movement of the vision sensor 100, and/or movement of the image processing device 10. Restated, such change may result from a movement of the object being imaged in relation to the vision sensor 100. The vision sensor 100 may periodically or non-periodically transmit the event signals EVS to the processor 200. The vision sensor 100 may transmit the event signals EVS to the processor 200 in packet units or frame units. For example, a pixel array of the vision sensor 100 may capture an image of an object (e.g., may image the object) based on the pixels PX of the pixel array generating one or more electrical signals in response to incident light being received and/or absorbed at said pixels PX. When the object being imaged moves in relation to the vision sensor 100, the intensity of incident light on one or more of the pixels PX may change due to the movement, and said one or more pixels PX may, in response to said change, generate one or more electrical signals that may cause the vision sensor 100 to generate one or more event signals EVS corresponding to the pixels PX for which the incident light intensity has changed. Accordingly, the vision sensor 100 may generate a plurality of event signals corresponding to the pixels PX at which incident light intensity is changed due to movement of the object being imaged, and thus the event signals EVS may be generated based on movement of the object being imaged in relation to the vision sensor 100.

The vision sensor 100 may selectively transmit the event signals EVS to the processor 200. From among the event signals EVS generated in correspondence to the pixel array of the vision sensor 100 (110 of FIG. 3), the vision sensor 100 may transmit, to the processor 200, event signals EVS generated from a limited selection of pixels PX corresponding to a region of interest set on the pixel array 110, and thus the vision sensor 100 may transmit a limited selection of event signals EVS to the processor 200. Restated, the vision sensor 100 may, when operating in certain operation modes, transmit any or all generated event signals EVS to the processor 200 and, when operating in one or more other separate operation modes, transmit only some (or one) of the generated event signals EVS to the processor 200 while refraining from transmitting (e.g., excluding from transmission) a remainder one or more of the generated event signals EVS.

In some example embodiments, when an excessive amount (e.g., quantity, count, etc.) of events occurs (e.g., within a certain period of time) or in an occasion in which an excessive amount of events is expected to occur (e.g., within a certain period of time), the vision sensor 100 may selectively transmit the event signals EVS to the processor 200 (e.g., transmit only some of the generated event signals EVS to the processor 200 and exclude some other of the generated event signals EVS from being transmitted to the processor 200). In addition, the vision sensor 100 may adjust event occurrence conditions and/or detection conditions (e.g., threshold values) to reduce an amount (e.g., quantity, count, etc.) of event signals EVS that are generated and/or transmitted at any given point in time. In some example embodiments, the vision sensor 100 may set event occurrence conditions or detection conditions, which are set with respect to a region of interest of the pixel array of the vision sensor 100, to be different from event occurrence conditions or detection conditions set with respect to another region of the pixel array of the vision sensor 100. In some example embodiments, the vision sensor 100 may differently set event occurrence conditions or detection conditions with respect to a plurality of regions of interest of the pixel array of the vision sensor 100.

The processor 200 may process the event signals EVS received from the vision sensor 100 and, based on said processing, detect a movement of an object that is being imaged by the vision sensor 100 (or a movement of an object on an image that is recognized (e.g., an image that is generated, captured, etc.) by the image processing device 10, for example based on signals generated by vision sensor 100 and/or vision sensor 101). The processor 200 may include an application specific integrated circuit (ASIC), a field-programmable gate array (FPGA), a dedicated microprocessor, a microprocessor, a general purpose processor, and the like. In some example embodiments, the processor 200 may include an application processor or an image processor.

Some or all of the vision sensor 100 and/or the processor 200 may be included in, may include, and/or may be implemented by, one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. In some example embodiments, the processing circuitry may include a non-transitory computer readable storage device (e.g., a memory), for example a solid state drive (SSD), storing a program of instructions, and a processor configured to execute the program of instructions to implement the functionality of some or all of the vision sensor 100 and/or the processor 200.

In addition, the vision sensor 100 and the processor 200 may be respectively realized as integrated circuits (IC). For example, the vision sensor 100 and the processor 200 may include individual semiconductor chips. Alternatively, the vision sensor 100 and the processor 200 may be realized in a single chip. For example, the vision sensor 100 and the processor 200 may be realized as a single system on chip (SoC).

Figure 2:
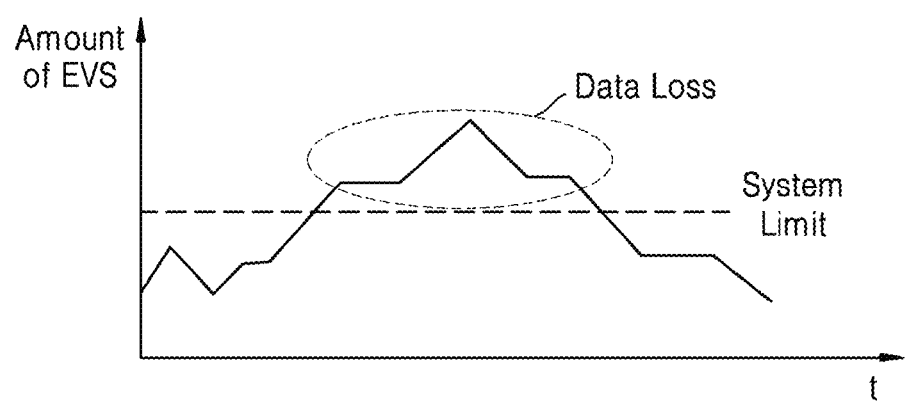
FIG. 2 is a graph showing a case in which event signal loss occurs.

FIG. 2 is a graph showing a case in which data loss of event signals EVS occurs.

Referring to FIG. 2, the horizontal axis indicates elapsed time and the vertical axis indicates an amount (e.g., quantity, count, etc.) of event signals EVS transmitted from the vision sensor 100 to the processor 200 at any given point in time. In a process of transmitting the event signals EVS to the processor 200, loss of event signals EVS, that is, data loss, may occur. When a large amount of events (e.g., changes in intensity of incident light on one or more pixels of the pixel array of the vision sensor) occurs for a long time period and an amount of event signals EVS transmitted from the vision sensor 100 to the processor 200, that is, an amount of transmission data over the time period, a rate of data transmission, etc., exceeds a system limit (also referred to as a threshold amount of transmission data that may be transmitted from the vision sensor to the processor 200 at any given time), for example, a transmission speed limit of a communication channel between the vision sensor 100 and the processor 200, data loss may occur. Thus, the performance of the image processing device 10, for example, the accuracy of detecting the movement of the object by the image processing device 10, may degrade.

However, in the image processing device 10 according to some example embodiments, as described above with reference to FIG. 1, the vision sensor 100 may selectively transmit one or more event signals EVS generated at the vision sensor 100 to the processor 200, which may include selectively transmitting a limited selection (e.g., only some, or one) of the event signals EVS that are generated at the vision sensor 100 during one or more particular time periods, and the amount of event signals EVS that are transmitted may be reduced, in comparison to the amount of event signals EVS that are transmitted if all event signal EVS generated during the one or more particular time periods were transmitted from the vision sensor 100 to the processor 200. Accordingly, data loss in a process of transmitting the event signals EVS between the vision sensor 100 and the processor 200 may be reduced or prevented. Thus, the performance of the image processing device 10, for example, the accuracy of detecting the movement of the object by the image processing device 10, may be improved.

Figure 3:
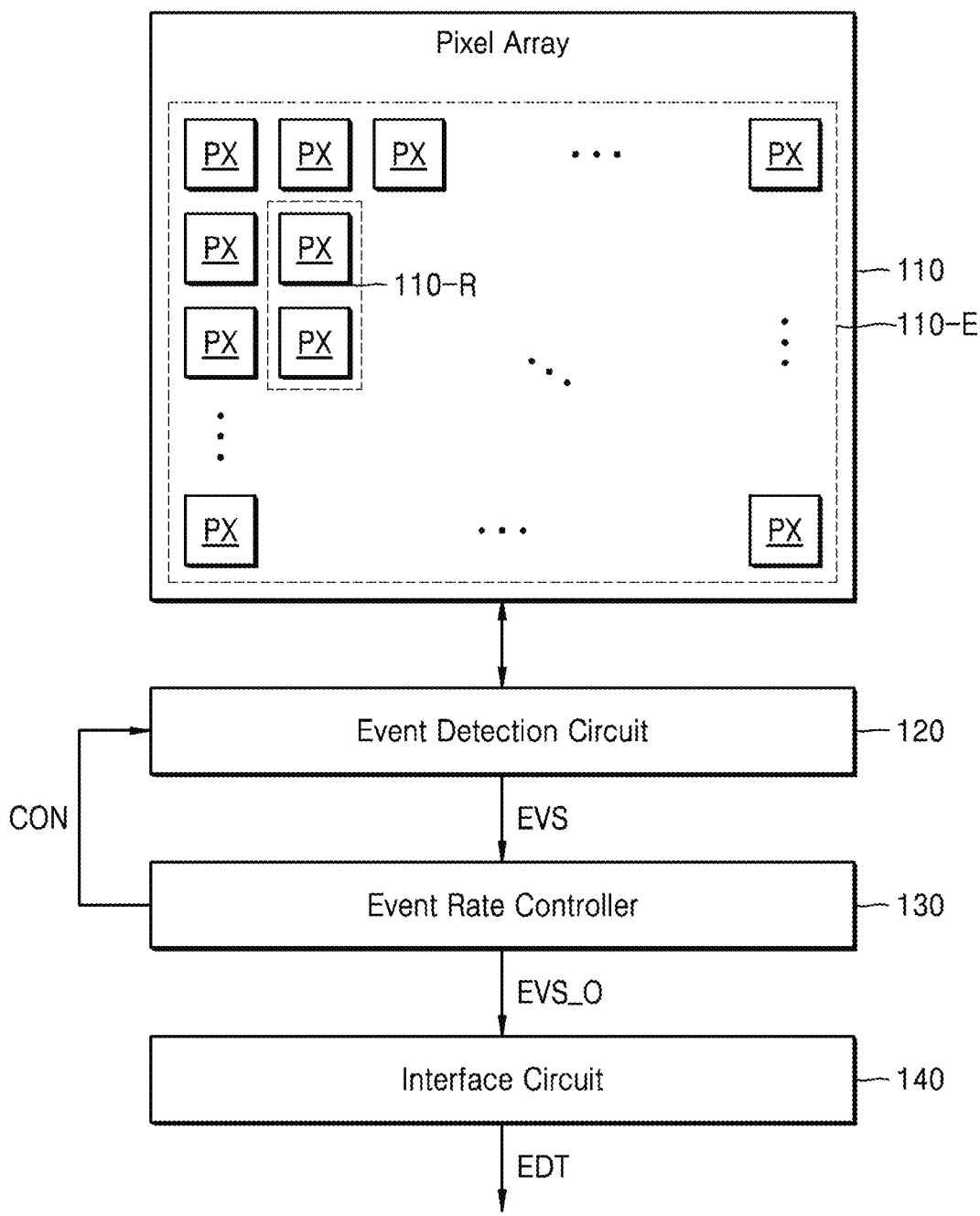
FIG. 3 is a block diagram of a vision sensor according to some example embodiments of the inventive concepts.

FIG. 3 is a block diagram of the vision sensor 100 according to some example embodiments of the inventive concepts.

Referring to FIG. 3, the vision sensor 100 may include a pixel array 110, an event detection circuit 120, an event rate controller 130, and an interface circuit 140. The pixel array 110, the event detection circuit 120, the event rate controller 130, and the interface circuit 140 may be respectively realized as integrated circuits (IC). For example, the pixel array 110, the event detection circuit 120, the event rate controller 130, and the interface circuit 140 may include individual semiconductor chips. Alternatively, two or more of the pixel array 110, the event detection circuit 120, the event rate controller 130, or the interface circuit 140 may be realized in a single chip. For example, the event detection circuit 120, the event rate controller 130, and the interface circuit 140 may be realized as a single system on chip (SoC).

Some or all of the pixel array 110, the event detection circuit 120, the event rate controller 130, and the interface circuit 140 may be included in, may include, and/or may be implemented by, one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. In some example embodiments, the processing circuitry may include a non-transitory computer readable storage device (e.g., a memory), for example a solid state drive (SSD), storing a program of instructions, and a processor configured to execute the program of instructions to implement the functionality of some or all of the pixel array 110, the event detection circuit 120, the event rate controller 130, and the interface circuit 140.

The pixel array 110 may include a plurality of pixels PX arranged in a matrix. The plurality of pixels PX may each sense incident light. In some example embodiments, the plurality of pixels PX may each generate one or more electrical signals in response to incident light being received at the respective pixels PX, and an image of an external scene, including an image of an object, may be generated based on processing (e.g., at processor 200), the signals generated by the pixels PX in response to receiving the incident light. Said image may be generated by a separate pixel array 110, which may be included in a separate vision sensor (e.g., vision sensor 101 as shown in FIG. 1). The plurality of pixels PX may each sense events in which the intensity of light that is received (e.g., intensity of incident light on the respective pixels PX) increases or decreases. For example, each of the plurality of pixels PX may be connected to the event detection circuit 120 through column lines extending in a column direction and row lines extending in a row direction. An electrical signal for noticing (e.g., an electrical signal indicating) the occurrence of an event and polarity information of the event (that is, whether the event is an on-event in which the intensity of light increases or an off-event in which the intensity of light decreases) may be output from the pixel PX (e.g., generated at the pixel PX and transmitted from the pixel PX), in which the event occurred, in response to the occurrence of said event (e.g., in response to a change in intensity of incident light received and/or absorbed at said pixel PX), to the event detection circuit 120.

The event detection circuit 120 may read-out the events from the pixel array 110 and process the events. For example, a pixel PX of the pixel array 110 may output an electrical signal in response to a change in intensity of incident light on the pixel PX, and the event detection circuit 120 may receive and process said electrical signal output by the pixel PX to determine the occurrence of an event at the pixel PX. In response to such determination, the event detection circuit 120 may generate an event signal EVS corresponding to the pixel PX (also referred to as an event signal EVS corresponding to the occurrence of the event at the pixel PX and/or corresponding to the event itself), where the event signal EVS includes (e.g., indicates) the polarity of the occurred event (e.g., whether incident light intensity increased or decreased at the pixel PX), an address of the pixel PX in which the event occurred, and a time stamp indicating when the event occurred. Restated, the event detection circuit 120 may be configured to detect whether a change in intensity of incident light has occurred at any pixels PX of the plurality of pixels PX based on processing one or more electrical signals received from one or more pixels PX of the plurality of pixels PX, and the event detection circuit 120 may generate one or more event signals EVS corresponding to one or more pixels PX, of the plurality of pixels PX, at which a change in intensity of incident light is determined to have occurred, respectively.

The event detection circuit 120 may process the events that occurred in the pixel array 110 (e.g., process the electrical signals output from various pixels PX of the pixel array 110) in pixel units, pixel group units including a plurality of pixels, column units, or frame units.

The event rate controller 130 may adjust an amount of the event signals EVS (generated at the event detection circuit 120) to be transmitted to the processor 200. In some example embodiments, the event rate controller 130 may select only the event signals EVS generated in a given time period based on event(s) occurring at the particular pixels PX included in the ROI 110-R of the pixel array 110 (e.g., only the event signals EVS corresponding to the particular pixels PX included in the ROI 110-R of the pixel array 110) from among the entirety of event signals EVS generated at the event detection circuit 120 in the given time period (e.g., all of the event signals EVS, corresponding to any pixels PX included in the entire region 110-E of the pixel array 110, generated during the given time period). For example the event rate controller 130 may select a limited selection of event signals EVS that comprises only the event signals EVS, generated during a given time period, that correspond to the limited selection of pixels PX of the pixel array 110 that are included in the ROI 110-R of the pixel array 110, where the limited selection of event signals EVS generated in a given time period may be less than all of the event signals EVS generated at in the given time period and thus at least one of the event signals EVS may be not selected (e.g., may be excluded from the limited selection of event signals EVS). The event rate controller 130 may output the selected event signals (hereinafter, referred to as output event signals EVS_O) to the interface circuit 140, or control the event detection circuit 120 to output the output event signals EVS_O to the interface circuit 140, and thus may refrain from outputting any event signals EVS that are not selected (e.g., exclude said non-selected event signals EVS from transmission to the interface circuit 140). Restated, the event rate controller 130 may be configured to select, from among one or more event signals EVS generated at the event detection circuit 120, a selection of one or more event signals EVS that correspond to a region of interest (ROI) on the pixel array as one or more output event signals EVS_O, which may include a limited selection of the event signals EVS and thus may exclude one or more of the event signals EVS that are generated at the event detection circuit 120.

In some example embodiments, the event rate controller 130 may reduce the amount of event signals EVS that are generated at the event detection circuit 120. The event rate controller 130 may adjust event occurrence conditions or event detection conditions (e.g., event occurrence threshold values or event detection threshold values), and thus may adjust the threshold value based upon which the event detection circuit 120 selectively generates one or more event signals EVS in response to receiving one or more electrical signals from the pixel array 110. For example, the event occurrence conditions may include a sensitivity of the pixel PX, and the event detection conditions may include an event detection period, a de-noise condition (for example, a de-noise threshold value), and the like.

In some example embodiments, when an excessive amount of events occurs or an excessive amount of events is expected to occur (e.g., an amount of events that at least meets a threshold amount) within a given time period (e.g., period of time), the event rate controller 130 may reduce the amount of event signals EVS to be transmitted or reduce the amount of event signals EVS that are generated at the event detection circuit 120. For example, the event rate controller 130 may count the quantity (amount) of event signals EVS in a particular (or, alternatively, predetermined) time unit (period of time, time period, etc.), and when the amount of event signals EVS that are counted is equal to or greater than a particular (or, alternatively, predetermined) reference value (also referred to herein as a threshold value or threshold amount), the event rate controller 130 may responsively determine that an excessive amount of events occurred during the particular time unit. For example, the event rate controller 130 may determine whether conditions under which an excessive amount of events is expected occurred, based on luminance of an object that is captured, illuminance around the object, an amount (e.g., intensity) of light received by the pixel array 110 (see FIG. 1), and the like. Accordingly, the event rate controller 130 may control the generation and/or transmission of one or more event signals EVS so that the amount of output event signals EVS_O does not meet or exceed a threshold amount (e.g., the system limit as shown in FIG. 2).

The interface circuit 140 may receive the output event signals EVS_O transmitted by the event rate controller 130 and transmit the output event signals EVS_O to the processor 200 (see FIG. 1) according to a particular (or, alternatively, predetermined) protocol. Thus, the interface circuit 140 may be configured to communicate with an external processor in relation to the vision sensor 100 (e.g., processor 200) and transmit the one or more output event signals EVS_O to the external processor. The interface circuit 140 may pack the output event signals EVS_O, according to the particular (or, alternatively, predetermined) protocol, in an individual signal unit, a packet unit, or a frame unit to generate event data EDT and transmit the event data EDT to the processor 200. For example, the interface circuit 140 may include one of an AER interface, a mobile industry processor interface (MIPI), and parallel interfaces. The processor 200 may process the transmitted output event signals EVS_O or event signals EVS that are transmitted by the interface circuit 140 to detect movement of an object being imaged by the pixel array 110 of the vision sensor 100.

Hereinafter, according to the inventive concepts, the expression that the event signals EVS or the output event signals EVS_O are output indicates that the event signals EVS or the output event signals EVS_O are converted into the event data EDT through the interface circuit 140 and the event data EDT is transmitted to the processor 200.

Figure 4A:
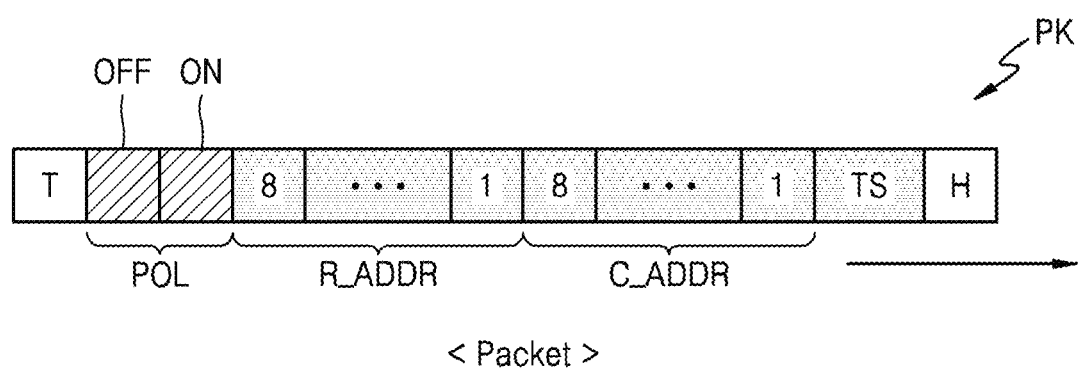
FIGS. 4A and 4B each show a format of event data output from a vision sensor according to some example embodiments of the inventive concepts.
Figure 4B:
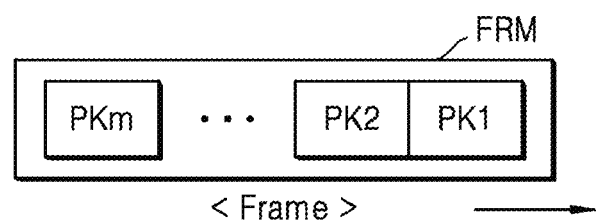

FIGS. 4A and 4B each show a format of event data output from the vision sensor 100 according to some example embodiments of the inventive concepts.

Referring to FIG. 4A, a packet PK including at least one event signal EVS may be output as event data (EDT). The packet PK may include a time stamp TS, a column address C_ADDR, a row address R_ADDR, and polarity information POL of the event signal EVS, and the above-mentioned arrangement order is not limited to the order shown in FIG. 4A. A header H indicating the start of the packet PK and a tail T indicating the end of the packet PK may be added to a front end of the packet PK and a back end of the packet PK, respectively. Although FIG. 4A shows that the packet PK includes only an event signal EVS, the packet PK is not limited thereto and may include a plurality of event signals EVS.

The time stamp TS may include information regarding the time at which the event occurs. For example, the time stamp TS may include 32 bits but is not limited thereto.

The column address C_ADDR and the row address R_ADDR may include a plurality of bits, for example, 8 bits, respectively. In this case, a vision sensor including a plurality of pixels arranged at most eight columns and eight rows may be provided. However, this is merely an example, and bit rates of the column address C_ADDR and the row address R_ADDR may vary according to the number of pixels PX.

Polarity information POL may include information regarding an on-event and an off-event. For example, the polarity information (POL) may include one bit including information regarding whether the on-event occurred and one bit including information regarding whether the off-event occurred. For example, the bit indicating the on-event and the bit indicating the off-event may not be both '1', but may be both '0'.

Referring to FIG. 4B, frame data including a plurality of packets PK, for example, a first through an $m^{th}$ packet PK1 through PKm (m is an integer equal to or greater than 2) may be output as event data. In some example embodiments, the frame data may include event signals EVS generated when the pixel array 110 (see FIG. 3) is scanned once, and therefore, the number of packets PK may vary for each frame data. In some example embodiments, the frame data may include a fixed number of packets PK.

Figure 5A:
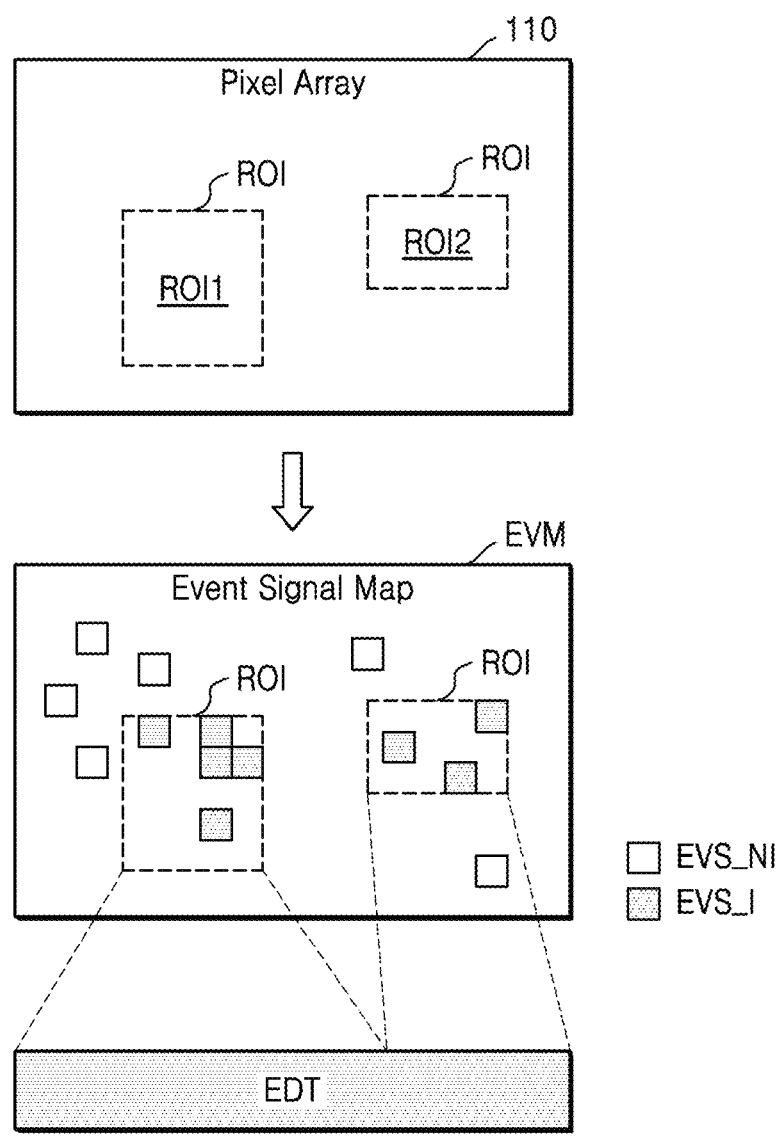
FIGS. 5A and 5B are each a diagram for describing a method of outputting event signals corresponding to interest areas from a vision sensor according to some example embodiments of the inventive concepts.
Figure 5B:
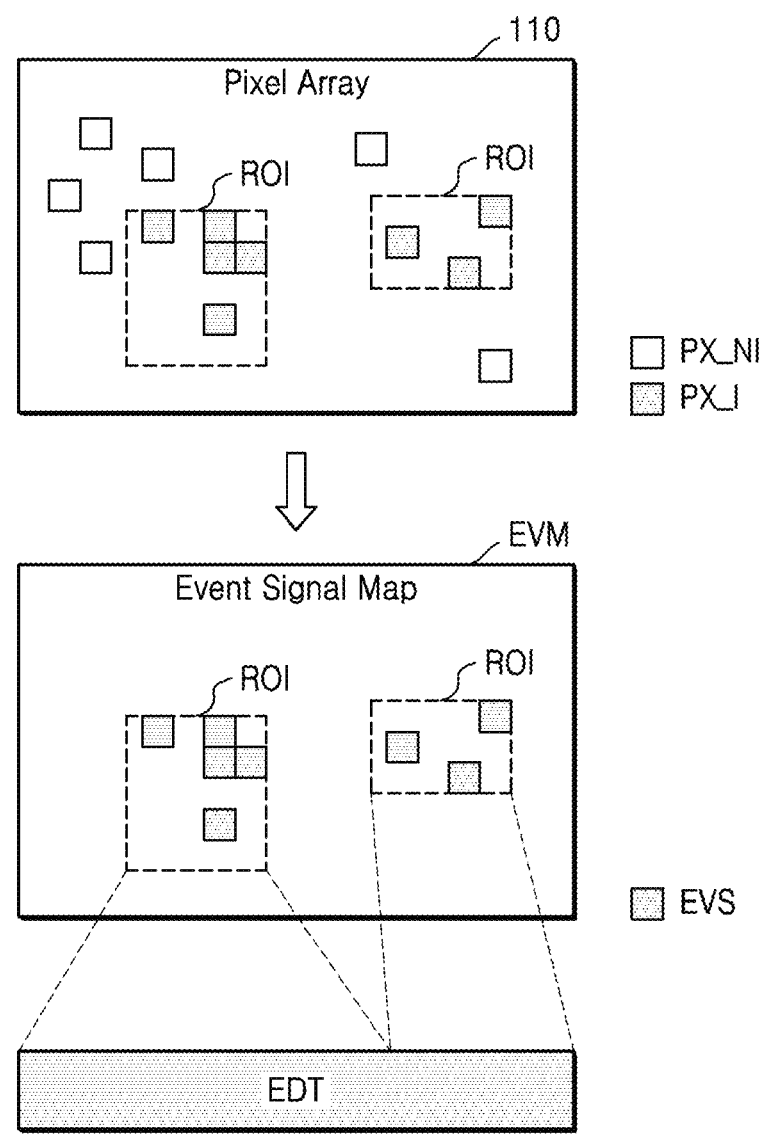

FIGS. 5A and 5B are each a diagram for describing a method of outputting event signals EVS corresponding to ROIs from the vision sensor 100 according to some example embodiments of the inventive concepts.

Referring to FIG. 5A, at least one ROI, for example, a first ROI ROI1 and a second ROI ROI2, may be set (e.g., established, defined, etc.) with respect to the pixel array 110. In FIG. 5A, it is shown that two ROIs (e.g., the first ROI ROI1 and the second ROI ROI2) are set, however, the number of ROIs is not limited thereto, and one or more ROIs may be set.

From among a plurality of regions set with respect to the pixel array 110, a region in which many events occur may be set as a ROI, or an arbitrary region corresponding to pixels PX in which many events occur during a particular (or, alternatively, predetermined) time period may be set as a ROI. Alternatively, a user may arbitrarily set a ROI, or an arbitrary region corresponding to pixels PX that sense a particular object may be set as a ROI. However, the ROI is not limited thereto and may be set according to various methods.

The event signals EVS are generated based on the events that occurred in the pixel array 110, and as the event signals EVS include addresses, the event signals EVS may construct a virtual event map EVM according to positions of corresponding pixels PX on the pixel array 110. As shown in FIG. 5A, the event signals EVS may be classified into event signals EVS_I corresponding to the ROI and event signals EVS_NI corresponding to a region outside of the ROI. The event signals EVS_I corresponding to the ROI may be generated as event data EDT and transmitted to the processor 200 (see FIG. 1), while the event signals EVS_NI may be selectively excluded from being included in event data EDT and thus excluded from transmission to the processor 200.

Referring to FIG. 3, the event rate controller 130 may receive the event signals EVS from the event detection circuit 120 and may select only the event signals EVS_I corresponding to the ROI, from among the received event signals EVS, as output event signals EVS_O. The interface circuit 140 may output the output event signals EVS_O, which include the event signals EVS_I corresponding to the ROI and exclude the event signals EVS_NI corresponding to a region outside of the ROI, as the event data EDT to the processor 200 (see FIG. 1).

Referring to FIG. 5B, events may occur in some pixels PX of the plurality of pixels PX in the pixel array 110. From among the pixels PX in which the events occurred (e.g., at which incident light intensity changes), one or more event signals EVS that corresponds to pixels PX_I corresponding to the ROI may be generated, and the event signals EVS_NI corresponding to the pixels PX_NI corresponding to the regions outside of the ROI may be ignored (e.g., selectively excluded from transmission to the processor 200).

Referring to FIG. 3, the event rate controller 130 may provide information regarding the ROI, that is, addresses regarding the ROI, to the event detection circuit 120, and the event detection circuit 120 may selectively sense, based on the information regarding the ROI, the pixels PX_I corresponding to the ROI from among the plurality of pixels PX in the pixel array 110. By doing so, events of (e.g., electrical signals received at the event detection circuit 120 from) the pixels PX_I corresponding to the ROI may be read-out, and the event detection circuit 120 may selectively generate the event signals EVS based on the read-out events (e.g., only generate event signals EVS in response to electrical signals received from the pixels PX_I and selectively refrain from generating event signals EVS in response to electrical signals received from pixels PX_NI). The event signals EVS generated based on events occurring at the pixels PX_I corresponding to the ROI (e.g., the event signals EVS corresponding to the pixels PX_I) may be provided to the interface circuit 140. The interface circuit 140 may output (e.g., transmit) the received event signals EVS to the processor 200 (see FIG. 1) as event data EDT.

Figure 6:
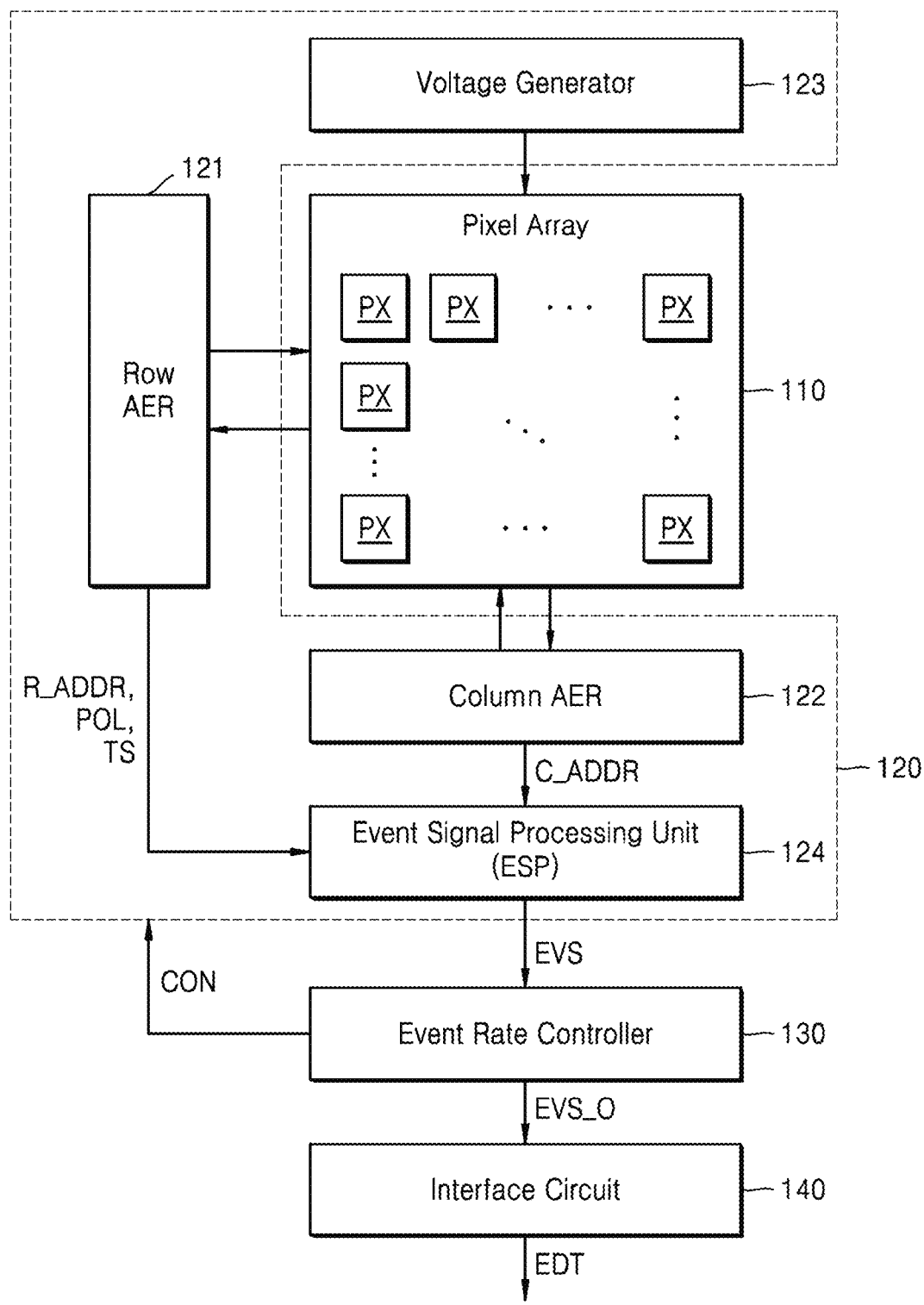
FIG. 6 is a block diagram of a vision sensor according to some example embodiments of the inventive concepts.

FIG. 6 is a block diagram of the vision sensor 100 according to some example embodiments of the inventive concepts;

Referring to FIG. 6, the vision sensor 100 includes the pixel array 110, the event detection circuit 120, the event rate controller 130, and the interface circuit 140, and the event detection circuit 120 may include a row address event representation (AER) 121, a column AER 122, a voltage generator 123, and an event signal processing (ESP) unit.

As the pixel array 110, the event rate controller 130, and the interface circuit 140 are described with reference to FIG. 3, repeated descriptions will be omitted.

The row AER 121 may receive, from one or more pixels PX of the pixel array 110, an electrical signal that notices (e.g., indicates) the occurrence of an event, that is, a row request, from a pixel PX in which the event occurred and generate a row address R_ADDR of the pixel PX in which the event occurred.

The column AER 122 may receive, from one or more pixels PX of the pixel array 110, an electrical signal that notices (e.g., indicates) the occurrence of an event, that is, a column request, from a pixel PX in which the event occurred and generate a column address C_ADDR of the pixel PX in which the event occurred.

In some example embodiments, the pixel array 110 may be scanned in column units, and when the column AER 122 receives a request from a specific column, for example, a first column, the column AER 122 may transmit a response signal to the first column. The pixel PX, which received the response signal, in which the event occurred, may transmit polarity information POL (for example, a signal indicating the occurrence of the on-event or the off-event) to the row AER 121. When the polarity information POL is received, the row AER 121 may transmit a reset signal to the pixel PX in which the event occurred. The pixel PX in which the event occurred may be reset in response to the reset signal. The row AER 121 may control a cycle in which the reset signals are generated. The row AER 121 may generate information regarding the time at which the event occurred, that is, the time stamp TS.

In some example embodiments, as described above with reference to FIG. 3, when an amount of generated event signals is adjusted, the row AER 121 may extend a cycle in which the reset signals are generated. When the cycle in which the reset signals occur are extended, a period during which the pixel array 110 is scanned (that is, a time period) increases, and thus, an amount of events occurring during a unit time period may be reduced. Thus, the performance of the image processing device 10 that includes the vision sensor 100, for example, the accuracy of detecting the movement of the object by the image processing device 10, may be improved.

Operations of the row AER 121 and the column AER 122 are described assuming a case in which the pixel array 110 is scanned in column units. However, the operations of the row AER 121 and the column AER 122 are not limited thereto, and the row AER 121 and the column AER 122 may read-out the occurrence of events and polarity information POL in various ways from the pixels PX in which the events occurred. For example, the pixel array 110 may be scanned in row units, the operations of the row AER 121 and the column AER 122 may be changed, that is, the column AER 122 may receive the polarity information POL and transmit the reset signal to the pixel array 110. In addition, the row AER 121 and the column AER 122 may also individually access the pixel PX in which the event occurred.

The voltage generator 123 may generate a voltage provided to the pixel array 110. For example, the voltage generator 123 may generate threshold voltages or bias voltages used for detecting the on-event and off-event from the pixels PX. In some example embodiments, as described above with reference to FIG. 3, when the sensitivity of the pixel PX is adjusted, the voltage generator 123 may change a level of reference voltage lines (or the bias voltages) under control of the event rate controller 130. The voltage generator 123 may change voltage levels of the threshold voltages provided to the pixels PX in the ROI and variously change the voltage levels of the threshold voltages with respect to the plurality of ROIs, respectively.

The ESP unit 124 may generate an event signal EVS based on the row address R_ADDR, the column address C_ADDR, the polarity signal POL, and the time stamp TS received from the row AER 121 and the column AER 122. In some example embodiments, the ESP unit 124 may remove a noise event and generate an event signal EVS with respect to effective events. For example, when the amount of events that occurred (e.g., amount of signals generated by one or more pixels PX and received at the event detection circuit 120) during a time period is less than a particular (or, alternatively, predetermined) threshold value (e.g., a de-noise threshold value), the ESP unit 124 may determine the events as noise and not generate (e.g., refrain from generating) an event signal EVS in response to the noise event, which may be referred to as "removing" and/or "excluding"

said noise events. Restated, the event detection circuit 120 may determine that one or more electrical signals generated by one or more pixels PX are noise events based on a de-noise threshold value and may responsively refrain from generating event signals EVS corresponding to the noise events.

In some example embodiments, as described with reference to FIG. 3, when the amount of event signals EVS that occurred is adjusted, the event rate controller 130 may increase a threshold voltage for determining noise, that is, the de-noise threshold value (e.g., via signal CON to the event detection circuit 120), and the ESP unit 124 may identify noise events based on the increased threshold value. For example, when the threshold value is set as 10 and an amount of events that occurred for (e.g., during) a unit time period is 12, the ESP unit 124 may determine the events as effective events and generate event signals EVS with respect to (e.g., corresponding to) the events. When the threshold value increases to 20 and the amount of events that occurred during the unit time period is 12, the ESP unit 124 may determine the events to be noise events, ignore the events, and not generate (e.g., refrain from generating) event signals EVS with respect to the events.

Figure 7:
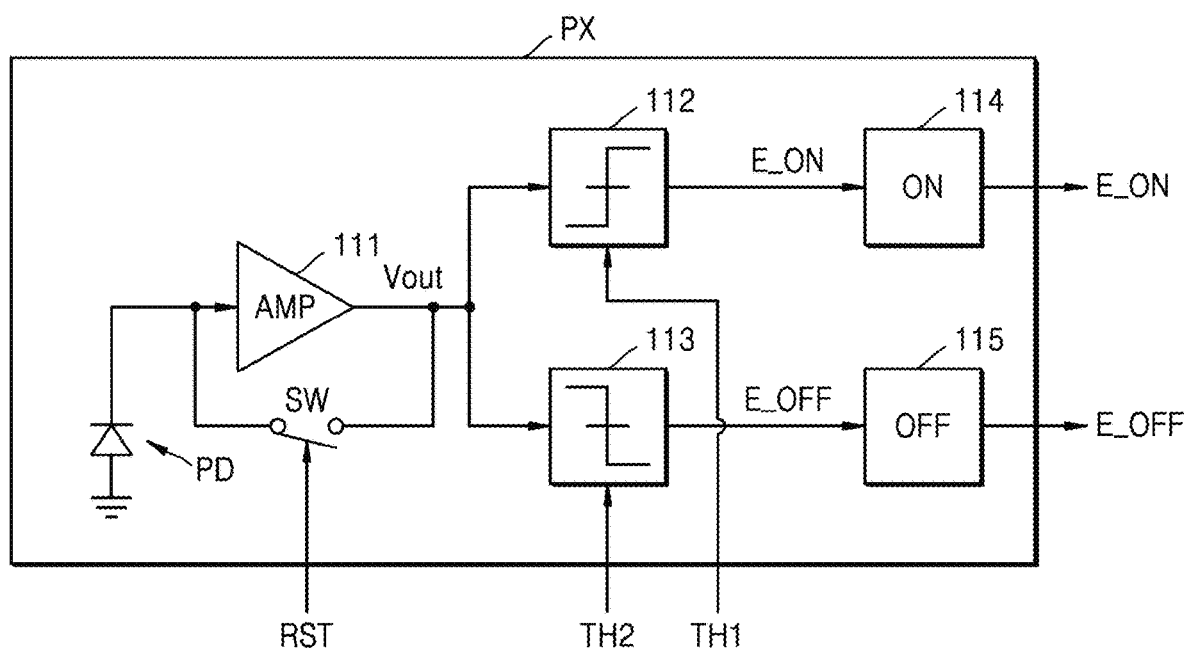
FIG. 7 is a circuit diagram showing some example embodiments of a pixel.

FIG. 7 is a circuit diagram showing some example embodiments of the pixel PX.

Referring to FIG. 7, the pixel PX may include the photoelectric transformation element PD, an amplifier 111, a first comparator 112, a second comparator 113, an on-event holder 114, an off-event holder 115, and a reset switch SW. In addition, the pixel PX may further include a capacitor for removing the noise occurring in the pixel or coming in from outside, various switches, and feedback circuits.

The photoelectric transformation device PD may convert incident light, that is, an optical signal, into an electric signal, for example, a current. The photoelectric transformation device PD may include, for example, a photodiode, a photo transistor, a photogate, a pinned photodiode, and the like. As the intensity of incident light increases, the photoelectric transformation device PD may generate an electric signal having a high level.

The amplifier 111 may convert the received current into a voltage and amplify a voltage level. An output voltage of the amplifier 111 may be provided to the first comparator 112 and the second comparator 113. In some example embodiments, a feedback circuit may be connected between an input terminal and an output terminal of the amplifier 111.

The first comparator 112 may compare an output voltage Vout of the amplifier 111 with an on-threshold voltage TH1 and generate an on-signal E_ON according to a result of the comparison. The second comparator 113 may compare the output voltage of the amplifier 111 with an off-threshold voltage TH2 and generate an off-signal E_OFF according to a result of the comparison. When the amount of change in light received by the photoelectric transformation device PD is equal to or greater than a certain change degree, the first comparator 112 and the second comparator 113 may generate an on signal E_ON or an off signal E_OFF.

For example, the on signal E_ON is high level when the amount of light received by the photoelectric transformation device PD increases to a certain degree or higher, and the off-signal E_OFF may be high level when the amount of light received by the photoelectric transformation device decreases to a certain degree or lower. An on-event holder 114 and an off-event holder 115 may hold and output the on signal E_ON and the off signal E_OFF, respectively. When the pixel PX is scanned, the on signal E_ON and the off signal E_OFF may be output. In addition, as described above, when the sensitivity is adjusted, levels of the on-threshold voltage TH1 and the off-threshold voltage TH2 may be changed. That is, the sensitivity may decrease. Accordingly, the level of the on-threshold voltage TH1 may increase and the level of the off-threshold voltage TH2 may decrease. Therefore, when the amount of change in light received by the photoelectric transformation device PD is greater than before (that is, before the levels of the on-threshold voltage TH1 and the off-threshold voltage TH2 are changed), the first comparator 112 and the second comparator 113 may generate the on-signal E_ON or the off signal E_OFF.

FIGS. 8A, 8B, 8C, and 8D are circuit diagrams respectively showing example embodiments indicating connection relationships between the photoelectric transformation device PD and the amplifier 111 shown in FIG. 7.

Figure 8A:
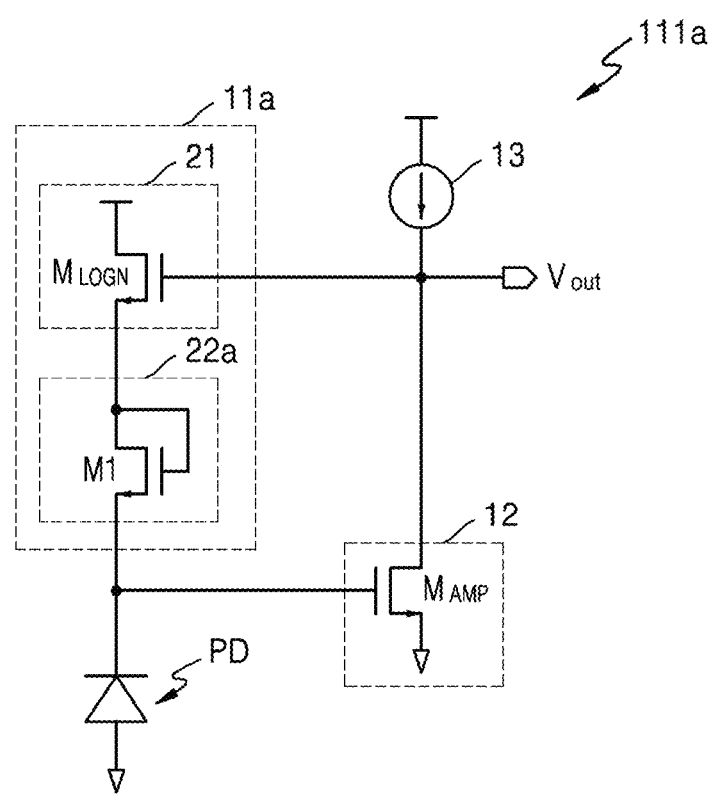
FIGS. 8A, 8B, 8C, and 8D are circuit diagrams respectively showing example embodiments indicating connection relationships between a photoelectric transformation element and an amplifier shown in FIG. 7.

Referring to FIG. 8A, an amplifier 111a may include an output circuit 12 and a feedback circuit 11a, and the feedback circuit 11a may include a converter circuit 21 and a boosting circuit 22a. The amplifier 111a may further include a current source 13 that provides a bias current to the output circuit 12.

An end of the output circuit 12 may be in contact with an end of the photoelectric transformation device PD and an end of the feedback circuit 11a. Another end of the output circuit 12 may be connected to another end of the feedback circuit 11a and an output node through which the output voltage Vout is output.

The output circuit 12 may generate the output voltage Vout, that is, an output signal, based on an input signal received from the photoelectric transformation device PD and a feedback signal received from the feedback circuit 11a. As it is shown, the output circuit 12 may include an amplification transistor $M_{AMP}$ that includes a gate node in contact with an end of the feedback circuit 11a, a source node to which a ground voltage is applied, and a drain node that generates the output voltage Vout. The output circuit 12 may generate the output voltage Vout by amplifying the feedback signal by using a set gain (a positive gain or a negative gain).

The feedback circuit 11a may feedback the output voltage Vout to a front end of the output circuit 12, that is, the gate node of the amplification transistor $M_{AMP}$. For example, the feedback circuit 11a may generate a feedback signal proportional to an index of a change amount of the output voltage Vout and feedback the feedback signal to the front end of the output circuit 12.

The converter circuit 21 may generate a conversion signal based on the output voltage Vout. In some example embodiments, the conversion signal may be a current proportional to the index of the change amount of the output voltage Vout. The converter circuit 21 may include a transistor $M_{LOG\_N}$ that includes a gate node for receiving the output voltage Vout and a source node for outputting the conversion signal based on the output voltage Vout. FIG. 8A shows a case in which the transistor $M_{LOG\_N}$ is an NMOS transistor, but the transistor $M_{LOG\_N}$ is not limited thereto and may be a PMOS transistor.

The boosting circuit 22a may output a boosting voltage proportional to a natural logarithm value of an input current. The boosting circuit 22a may include a transistor M1 in which a drain node and a gate node are in contact with each other. The transistor M1 included in the boosting circuit 22a may operate in a subthreshold region and generate a boosting voltage based on an input current. The boosting voltage may indicate a voltage applied to the gate node and the source node of the transistor M1. FIG. 8A shows the boosting circuit 22a including an NMOS transistor, but the boosting circuit 22a is not limited thereto and may include a PMOS transistor.

In some example embodiments, change ΔVout in the output voltage Vout according to time shown in FIG. 8A may be represented as 2×β×ln(Iin2/Iin1). In this case, Iin1 is a current provided from the photoelectric transformation device PD at a first time point, and Iin2 is a current provided from the photoelectric transformation device PD at a second time point after the first time point. β is a coefficient determined according to properties or operation temperatures of the transistors.

Figure 8B:
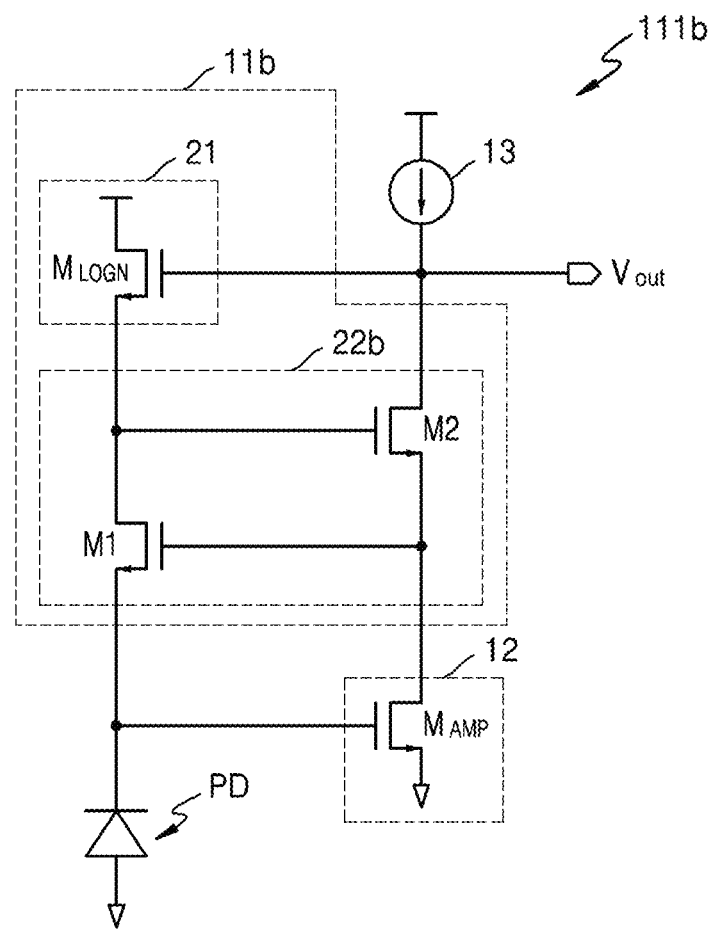
Figure 8C:
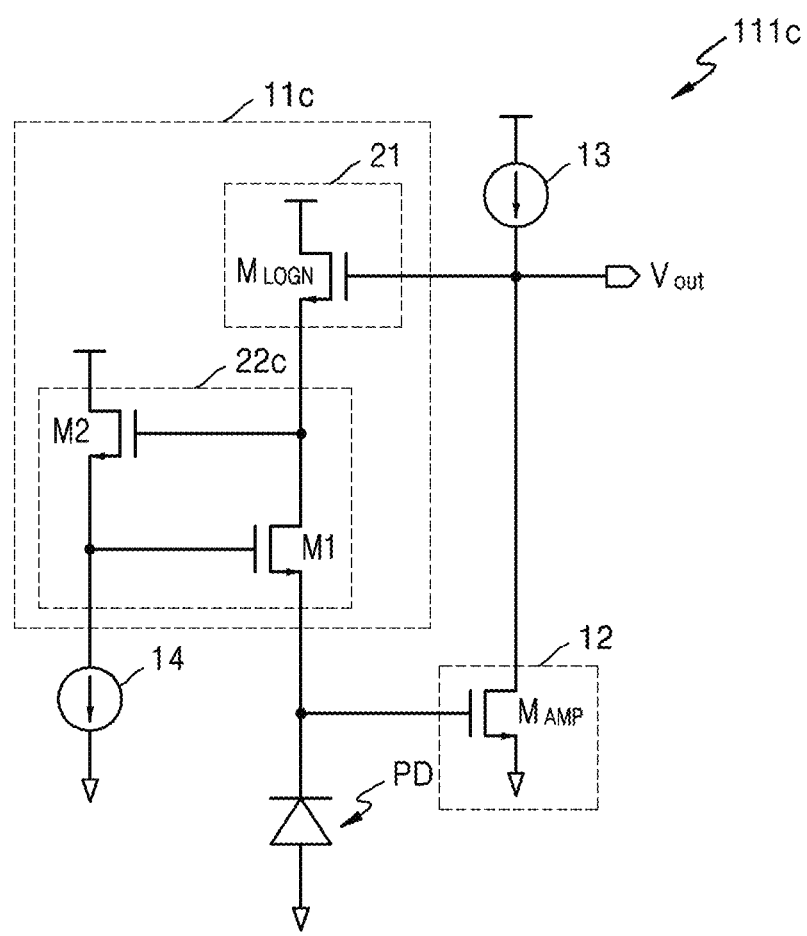
Figure 8D:
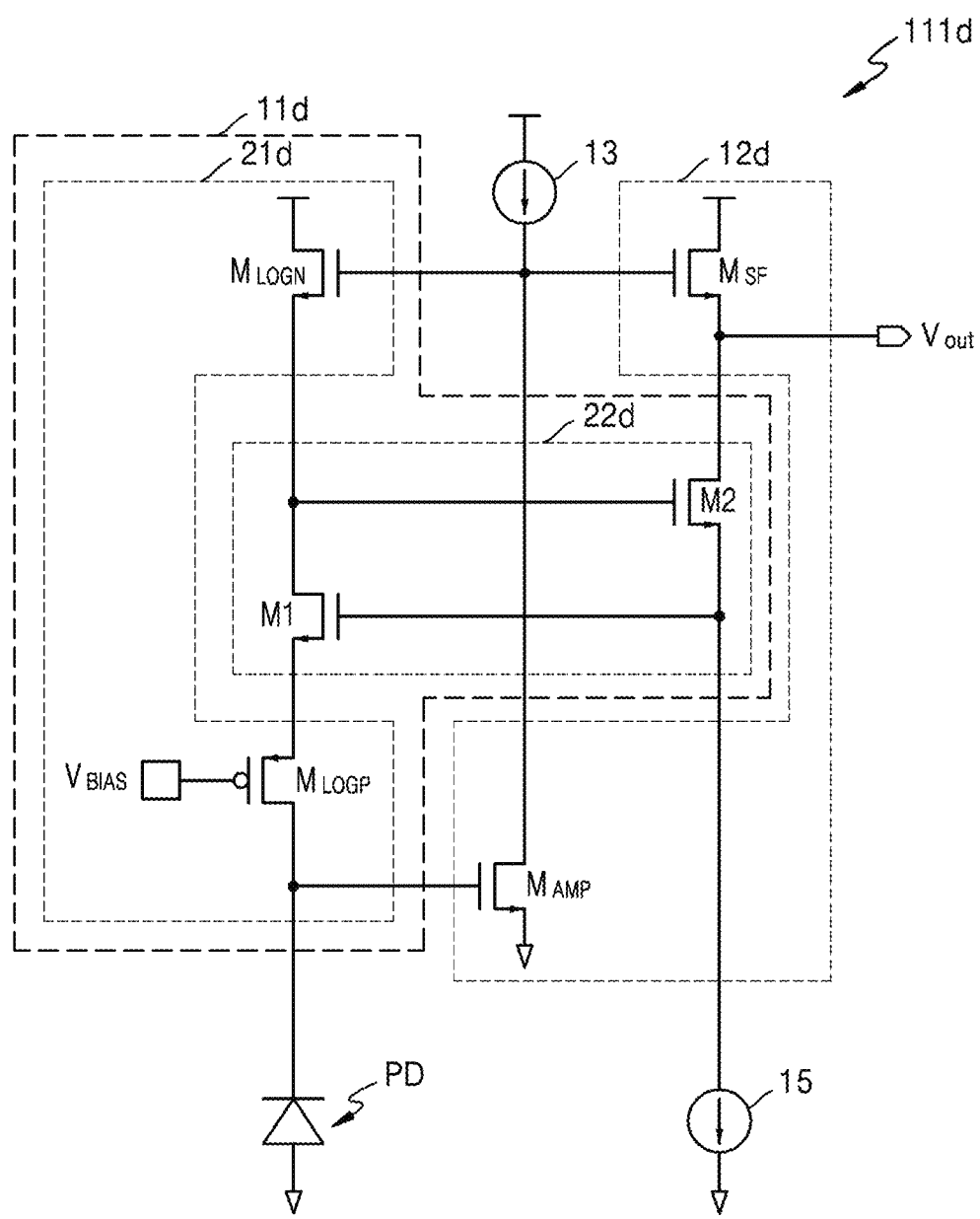

Connection relationships of the photoelectric transformation device PD and the amplifier, the components of the amplifier, and operations of the amplifier shown in FIGS. 8B through 8D are similar to a connection relationship between the photoelectric transformation device PD and the amplifier 111, the components of the amplifier 111a, and the operations of the amplifier shown in FIG. 8A. Therefore, differences will be mainly described hereinafter.

Referring to FIG. 8B, in an amplifier 111b, an end of the output circuit 12 may be in contact with the photoelectric transformation device PD and an end of the feedback circuit 11b. Another end of the output circuit 12 may be connected to another end of the feedback circuit 11b. In FIG. 8B, the feedback circuit 11b includes three ends, and a last end from among the three ends may be connected to the output node from which the output voltage Vout is output.

A boosting circuit 22b included in the feedback circuit 11b may include a first transistor T1 and a second transistor M2. The first transistor M1 may include a gate node in contact with a source node of the second transistor M2 and a drain node in contact with a gate node of the second transistor M2. The second transistor M2 may include the source node that is in contact with the gate node of the first transistor M1 and the gate node that is in contact with the drain node of the first transistor M1. The second transistor M2 may operate based on a bias current provided from the current source 13, and the first transistor M1 may operate based on a received input current. Although the first transistor M1 and the second transistor M2 are shown as NMOS transistors in FIG. 8B, the first transistor M1 and the second transistor M2 are not limited thereto and may be PMOS transistors.

Referring to FIG. 8C, an amplifier 111c may further include a current source 14 that syncs a bias current from a feedback circuit 11c.

Components and an operation of the feedback circuit 11c are similar to components and an operation of the feedback circuit 11b of FIG. 8B. A boosting circuit 22c included in the feedback circuit 11c may include the first transistor M1 and the second transistor M2. Unlike in FIG. 8C, the drain node of the second transistor M2 may be receive a power voltage and the source node may be connected to the current source 14 and the gate node of the first transistor M1.

Referring to FIG. 8D, an amplifier 111d may include an output circuit 12d and a feedback circuit 11d, and the feedback circuit 11d may include a converter circuit 21d and a boosting circuit 22d. The amplifier 111d may further include the current source 13 that provides the bias current to the output circuit 12d and a current source 15 that syncs the bias current from the output circuit 12d.

An end of the output circuit 12d may be connected to the photoelectric transformation device PD and an end of the feedback circuit 11d. Another end of the output circuit 12d may be connected to another end of the feedback circuit 11d. The output circuit 12d may generate an output voltage Vout, that is, an output signal, based on an input signal received from the photoelectric transformation device PD and a feedback signal received from the feedback circuit 11d. The output circuit 12d may include the amplification transistor $M_{AMP}$, which receives an input current and includes a gate node that corresponds to an end, and an output transistor $M_{SF}$ including a gate node corresponding to another end and a source node that generates the output voltage Vout. Here, the input current may be generated by the photoelectric transformation device PD.

The feedback circuit 11d may include a circuit structure in which a boosting circuit 22d of a source follower is connected to the converter circuit 21d with a cascade. The converter circuit 21d may include an NMOS transistor $M_{LOG\_N}$ and a PMOS transistor $M_{LOG\_P}$. The NMOS transistor $M_{LOG\_N}$ included in the converter circuit 21d may include a source node, which is in contact with a drain node of the first transistor M1 and a gate node of the second transistor M2 of the boosting circuit 22d, and a gate node in contact with another end of the output circuit 12d. The PMOS transistor $M_{LOG\_P}$ included in the converter circuit 21d may include a source node, which is in contact with the source node of the first transistor M1 of the boosting circuit 22d, and a drain node in contact with an end of the output circuit 12d and an end of the photoelectric transformation device PD. In addition, a bias power $V_{BIAS}$ may be applied to the gate node of the PMOS transistor $M_{LOG\_P}$.

Figure 9:
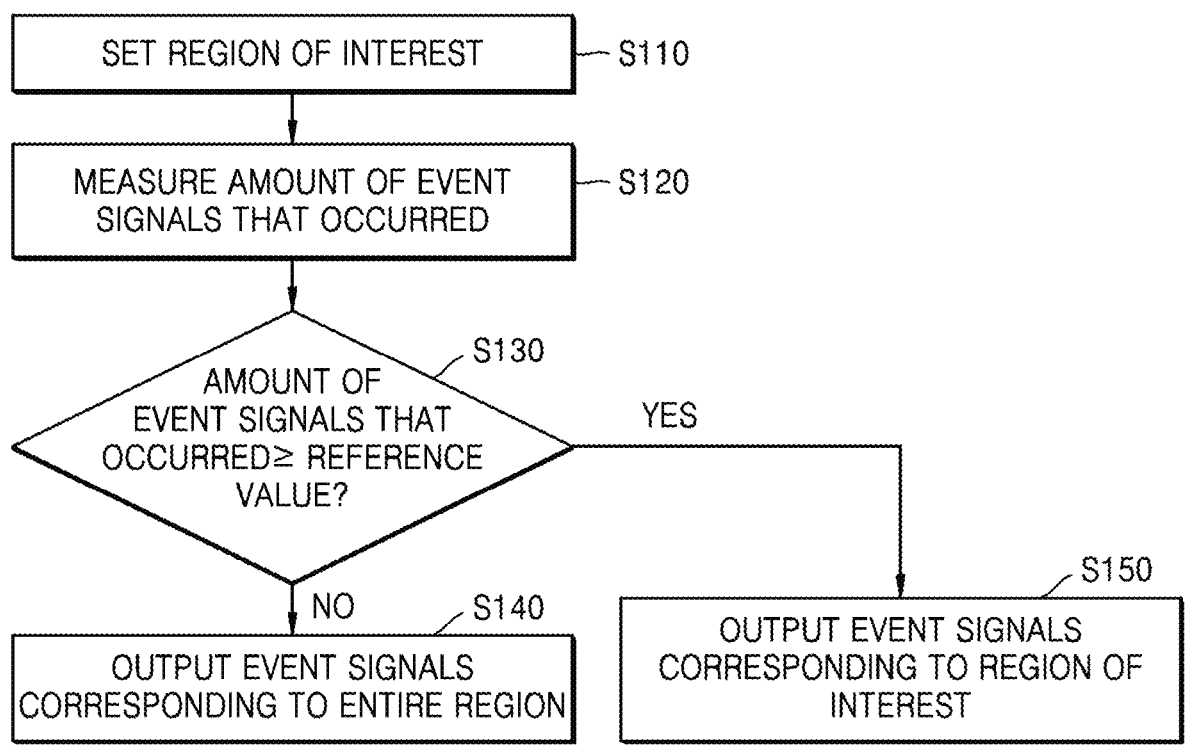
FIG. 9 is a flowchart showing an operating method of a vision sensor according to some example embodiments of the inventive concepts.

FIG. 9 is a flowchart showing an operating method of the vision sensor 100 according to some example embodiments of the inventive concepts. The operating method of FIG. 9 may be performed in the vision sensor 100 of FIG. 3, and more particularly, in the event rate controller 130. Accordingly, descriptions regarding the vision sensor 100 and operations thereof may be applied to the example embodiments shown in FIG. 9. Hereinafter, FIG. 9 will be described with reference to FIG. 3.

Referring to FIGS. 3 through 9, the vision sensor 100 may set (e.g., define) the ROI (Si 10). As described with reference to FIG. 5A, the event rate controller 130 may set the ROI based on the amount of events that occurred. Alternatively, the event rate controller 130 may set the ROI according to a user's settings or set pixels PX, which sense an object, as the ROI.

The vision sensor 100 may measure the amount of event signals that occurred (e.g., the amount of event signals EVS generated, in response to one or more pixels PX generating an electrical signal in response to a change in incident light intensity, within a particular time period) (S120). For example, the amount of event signals that occurred may be measured as the event rate controller 130 counts the event signals EVS generated during a particular (or, alternatively, predetermined) time period unit. In some example embodiments, operation S110 may be performed simultaneously with or after operation S120.

The vision sensor 100 may compare the amount (e.g., quantity, count, etc.) of event signals EVS that occurred (e.g., are generated during a particular time period) with a reference value (S130). When the amount of event signals EVS that occurred is less than the reference value, the vision sensor 100 may output event signals EVS corresponding to an entire region (e.g., may output any event signals EVS generated during the particular time period) (S140), and when the amount of event signals that occurred is equal to or greater than the reference value, the vision sensor 100 may selectively output event signals EVS corresponding to the ROI (e.g., may output only the event signals EVS that correspond to the ROI that are generated during the particular time period, and exclude any or all other event signals EVS generated during the particular time period) (S150). For example, the event rate controller 130 may compare the amount of event signals EVS that occurred with the reference value. When the amount of event signals EVS that occurred is less than the reference value, the event rate controller 130 may output the event signals EVS corresponding to the entire region and may output the event signals EVS corresponding to the ROI.

In other words, in the method shown in FIG. 9 the vision sensor 100 may determine an operation mode (also referred to herein as an operation mode of the vision sensor 100) and thus selectively cause the vision sensor 100 to operate in a particular determined (e.g., selected) operation mode, based on the amount of event signals EVS that occurred within a given time period. When (e.g., in response to a determination that) the amount of event signals that occurred is less than the reference value, the vision sensor 100 may responsively and selectively operate in a first operation mode in which the event signals EVS corresponding to the entire region are output, such that the event rate controller 130 may select, in response to the vision sensor 100 operating in the first operation mode, one or more event signals EVS that correspond to an entire region of the pixel array 110 (e.g., event signals EVS corresponding to signals output by any pixels PX in region 110-E which encompasses all pixels PX in the pixel array 110 as shown in FIG. 3) as the output event signals EVS_O. When (e.g., in response to a determination that) the amount of event signals EVS that occurred is equal to or greater than the reference value, the vision sensor 100 may responsively and selectively operate in a second operation mode in which the event signals EVS corresponding to the ROI are output, such that the event rate controller 130 may select, in response to the vision sensor 100 operating in the second operation mode, event signals EVS that correspond to the ROI (e.g., event signals EVS corresponding only to signals output by any pixels PX in region 110-R which is an ROI that encompasses a limited portion of the pixels PX in the pixel array 110 as shown in FIG. 3) as the output event signals EVS_O.

Accordingly, it will be understood that the event rate controller 130 may 1) measure an amount (e.g., quantity) of event signals EVS generated at the event detection circuit 120 based on counting the event signals EVS generated at the event detection circuit 120 for a particular (e.g., predetermined) time period and 2) selectively set an operation mode of the vision sensor 100 (also referred to herein as simply an operation mode) as one of the first operation mode or the second operation mode based on whether the amount of measured event signals EVS that are generated within the particular time period is less than a reference value.

Thus, the vision sensor 100 may selectively transmit all of the event signals EVS generated based on events occurring at any of the pixels PX of the pixel array 110 based on movement of the object being imaged or a limited selection of event signals EVS as one or more output event signals EVS_O in response to the vision sensor 100 operating in a first operation mode or a second operating mode, respectively, where the limited selection of event signals corresponds to one or more pixels PX of the plurality of pixels included in a region of interest (ROI) of the pixel array 110, and the vision sensor 100 may selectively operate in a selected operation mode of the first operation mode or the second operation mode based on comparing an amount of event signals EVS that are generated during a particular time period with a threshold value.

In some example embodiments, the event rate controller 130 may set the ROI to have a low sensitivity (e.g., may adjust the sensitivity of pixels PX in the ROI to have a reduced sensitivity) in response to the vision sensor 100 operating in the second operation mode, for example based on controlling the voltage generator 123 to change (e.g., increase) voltage levels of the threshold voltages provided to the pixels PX in the ROI and variously change (e.g., increase) the voltage levels of the threshold voltages with respect to the plurality of ROIs, respectively. In some example embodiments, the event rate controller 130 may increase the de-noise threshold for one or more pixels PX in one or more ROIs, so as to cause the event detection circuit to generate a reduced amount of event signals EVS in response to signals received from one or more pixels PX during a particular time period, in response to the vision sensor 100 operating in the second operation mode. Accordingly, the vision sensor 100 may, when operating in the second operating mode, set a plurality of ROIs and set different sensitivities of the pixels in the different ROIs (e.g., pixels PX in a first ROI may be set to each have a same, first sensitivity and pixels PX in a second ROI may be set to each have a same, second sensitivity that is different from the first sensitivity) and may set different de-noise threshold values of the pixels in the different ROIs (e.g., pixels PX in a first ROI may be set to each be associated with a same, first de-noise threshold value and pixels PX in a second ROI may be set to each be associated with a same, second de-noise threshold value that is different from the first de-noise threshold value).

Figure 10:
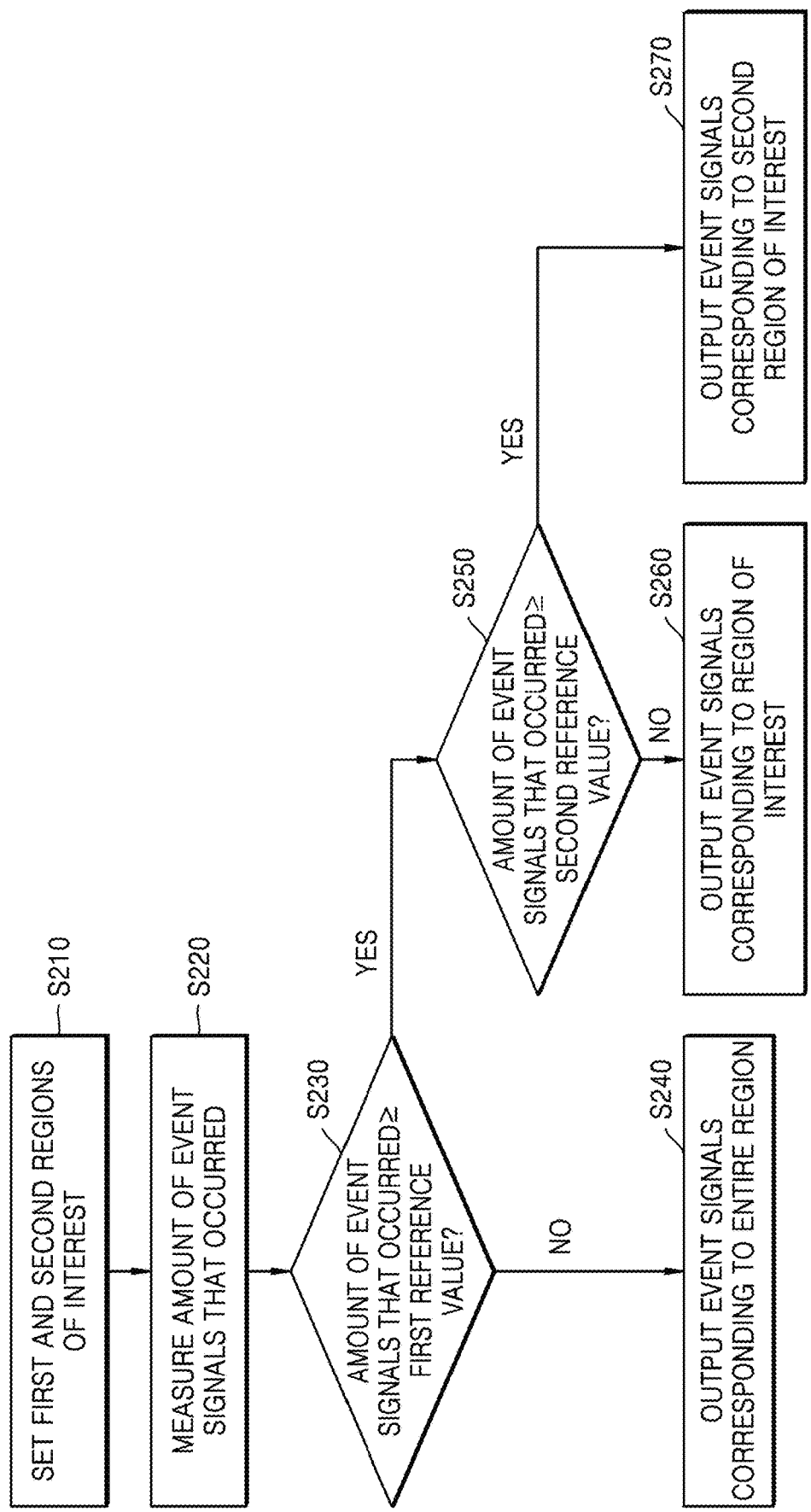
FIG. 10 is a flowchart showing an operating method of a vision sensor according to some example embodiments of the inventive concepts.

FIG. 10 is a flowchart showing an operating method of the vision sensor 100 according to some example embodiments of the inventive concepts. The operating method of FIG. 10 may be performed in the vision sensor 100 of FIG. 3, and more particularly, in the event rate controller 130. Accordingly, descriptions regarding the vision sensor 100 and operations thereof may be applied to the example embodiments shown in FIG. 10. Hereinafter, FIG. 10 will be described with reference to FIG. 3.

Referring to FIGS. 3 and 10, the vision sensor 100 may set the first ROI ROI1 and the second ROI ROI2 (S210). In other words, the vision sensor 100 may set a plurality of ROIs, such that the pixel array 110 includes a plurality of ROIs. The first ROI ROI1 may be set to have importance (or priority) that is lower than importance of the second ROI ROI2.

The vision sensor 100 may measure (e.g., count) the amount of event signals EVS that occurred (e.g., were generated at the event detection circuit 120 during a particular time period) (S220) and compare the amount of event signals EVS that occurred that is measured with a first reference value (S230). When the amount of event signals EVS that occurred is less than the first reference value, the vision sensor 100 may output event signals EVS corresponding to the entire region of the pixel array 110 (S240).

When the amount of event signals EVS that occurred is equal to or greater than the first reference value, the vision sensor 100 may compare the amount of event signals EVS that occurred with a second reference value (S250). The second reference value may be greater than the first reference value.

When the amount of event signals EVS that occurred is less than the second reference value, the vision sensor 100 may output event signals EVS corresponding to the first ROI ROI1 and the second ROI ROI2 (S260). In other words, the vision sensor 100 may output event signals EVS corresponding to any or all ROIs. Restated, the event rate controller 130 may set the operation mode as the second operation mode and select one or more event signals EVS corresponding to any ROI as the one or more output event signals EVS_O in response to the measured amount of event signals that are generated during the particular time period being equal to or greater than the first reference value and less than the second reference value. When the amount of event signals EVS that occurred is equal to or greater than the second reference value, the vision sensor 100 may output event signals EVS corresponding to the second ROI ROI2 (S270). In other words, based on the amount of event signals EVS that occurred, the vision sensor 100 may output the event signals EVS corresponding to a region that is determined as a relatively important region. Each separate, ROI may be associated with a separate importance value, and one of the ROIs (e.g., ROI1) may be associated with an importance value that is greater than importance values associated with a remainder of ROIs (e.g., ROI2). Thus, the event rate controller 130 may set the operation mode as a third operation mode and select one or more even signals EVS corresponding to at least one ROI that is associated with a greater importance value than importance values associated with a remainder of ROIs as the one or more output event signals EVS_O in response to the measured amount of event signals that are generated during the particular time period being equal to or greater than the second reference value. Even though the event signals EVS with respect to the entire region are not transmitted, the event signals EVS corresponding to the region having high importance are selectively transmitted to the processor 200 (see FIG. 1), and thus, degradation in performance of the vision sensor 100 may be reduced or prevented, and thus the performance of an electronic device (e.g., computing device) that includes the image processing device 10, and thus the vision sensor 100, may be improved, particularly with regard to accuracy in tracking movement of an object.

In addition, the operation mode of the vision sensor 100 is determined based on the amount of event signals EVS that occurred, and the operation mode may be changed in a particular (or, alternatively, predetermined) unit time period unit. Determining (e.g., selectively setting) the operation mode of the vision sensor 100 will be described with reference to FIG. 11.

Figure 11:
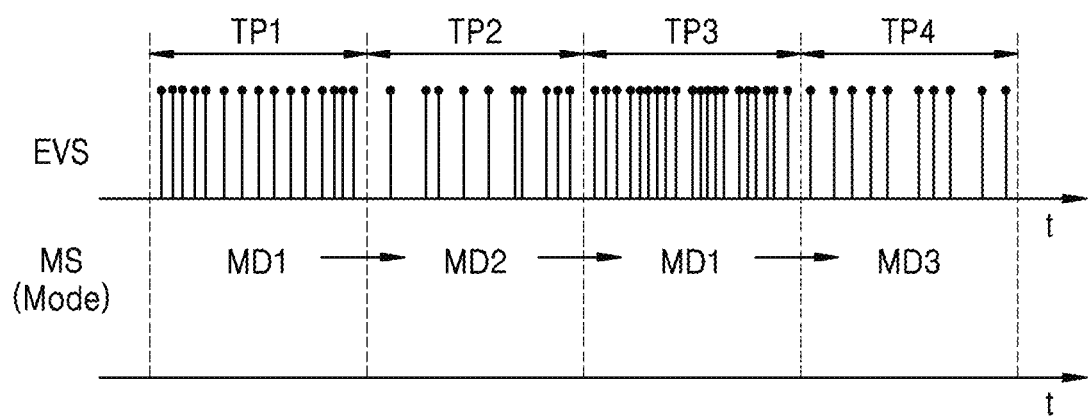
FIG. 11 is a diagram for describing a method of determining an operation mode of a vision sensor according to some example embodiments of the inventive concepts.

FIG. 11 is a diagram for describing a method of determining the operation mode of the vision sensor 100, according to some example embodiments of the inventive concepts.

Referring to FIG. 11, for each determined unit period, for example, each of a first time period TP1 through a fourth time period TP4, the amount of event signals EVS that occurred (e.g., are generated in response to electrical signals received from one or more pixels PX of the pixel array 110 of the vision sensor 100) may be measured, and the operation mode of the vision sensor 100 may be determined based on the amount of event signals EVS that occurred.

First, the vision sensor 100 may operate in a default mode, that is, a first mode MD1, for an initial period that is the first time period TP1. The vision sensor 100 may output all of the event signals EVS generated during the first time period TP1. When the output of the event signals EVS is delayed by a particular (or, alternatively, predetermined) unit period or longer, the vision sensor 100 may output all of the event signals EVS generated before the first time period TP1.

When the amount of event signals EVS counted for the first time period TP1, that is, the amount of event signals EVS that occurred, is equal to or greater than the first reference value, the vision sensor 100 may be set in the second operation mode MD2, and thus may operate in the second operation mode MD2, for the second time period TP2. The vision sensor 100 may selectively output the event signals EVS corresponding to the ROI from among the event signals EVS generated during the second time period TP2 or the first time period TP1. In some example embodiments, the occurrence conditions or detection conditions of the events may be adjusted such that the amount of event signals EVS that occurred is reduced.

When the amount of event signals EVS counted during the second time period TP2, that is, the amount of event signals EVS that occurred, is less than the first reference value, the vision sensor 100 may be set again in the first operation mode MD1, and thus may operate in the first operation mode MD1, during a third time period TP3. The vision sensor 100 may output all of event signals EVS generated during the third time period TP3 or the second time period TP2. In addition, the occurrence conditions or detection conditions of the events may be initialized during the third time period TP3. For example, the occurrence conditions or detection conditions of the events may be initialized according to a register setting value that is internally set or a register setting value that is set by the processor 200 (see FIG. 1).

When the amount of event signals EVS counted during the third time period TP3, that is, the amount of event signals EVS that occurred is equal to or greater than the second reference value, the vision sensor 100 may be set in the third operation mode MD3, and thus may operate in the third operation mode MD3, during the fourth time period TP4. The vision sensor 100 may selectively output event signals corresponding to the ROIs having high importance from among the event signals EVS generated during the fourth time period TP4 or the third time period TP3. In some example embodiments, the occurrence conditions or detection conditions of the events may be adjusted such that the amount of event signals EVS that occurred is reduced. In this case, the occurrence conditions or detection conditions of the events may be adjusted to be higher than the second time period TP2 (that is, a direction in which the amount of events or event signals EVS that occurred further decreases).

As it is described, the operation mode of the vision sensor 100 may be dynamically changed based on the amount of event signals EVS that occurred. For example, the event rate controller 130 may measure the amount of event signals EVS that are generated at the event detection circuit 120 during each particular time period, of a sequence of particular time periods, and dynamically set the operation mode at each particular time period based on the amount of event signals that are counted at the event rate controller during the particular time period.

Figure 12A:
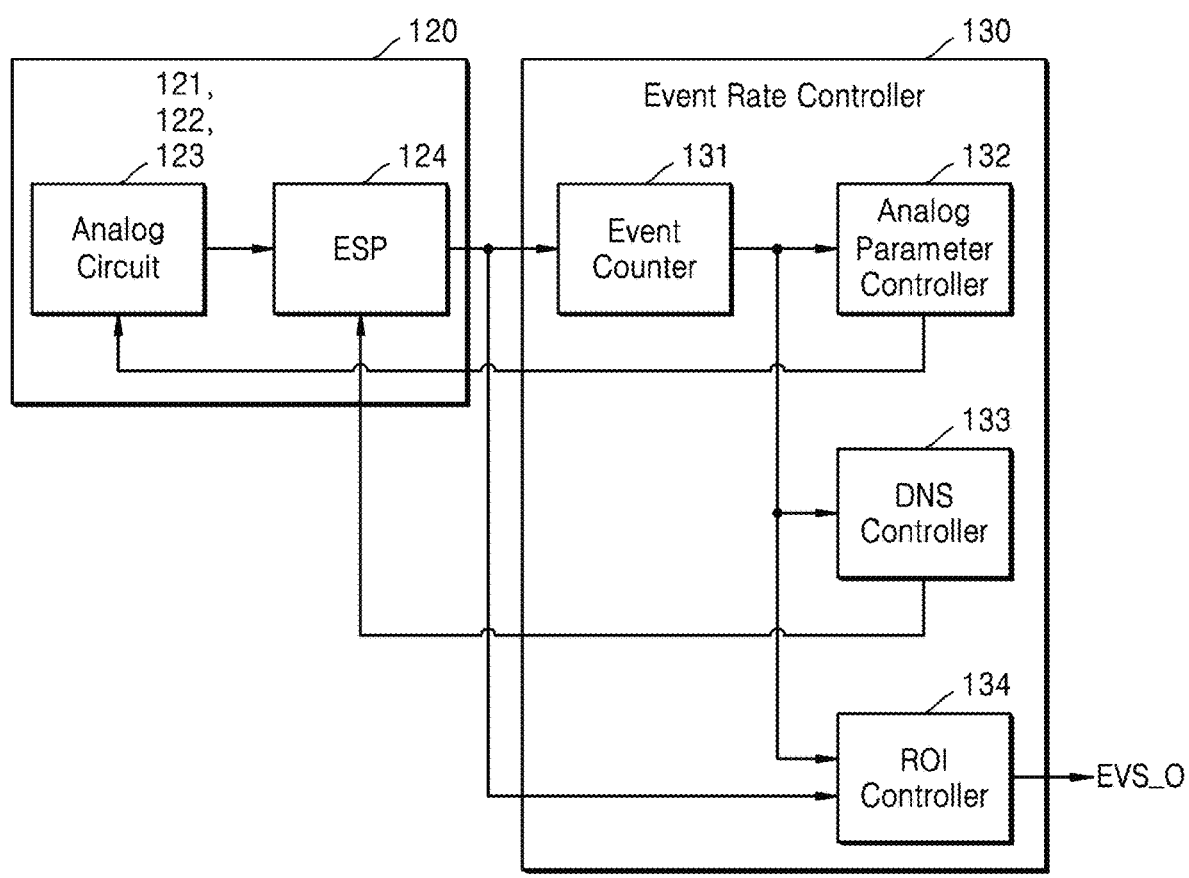
FIGS. 12A and 12B are block diagrams showing embodiments of an event rate controller shown in FIG. 3.
Figure 12B:
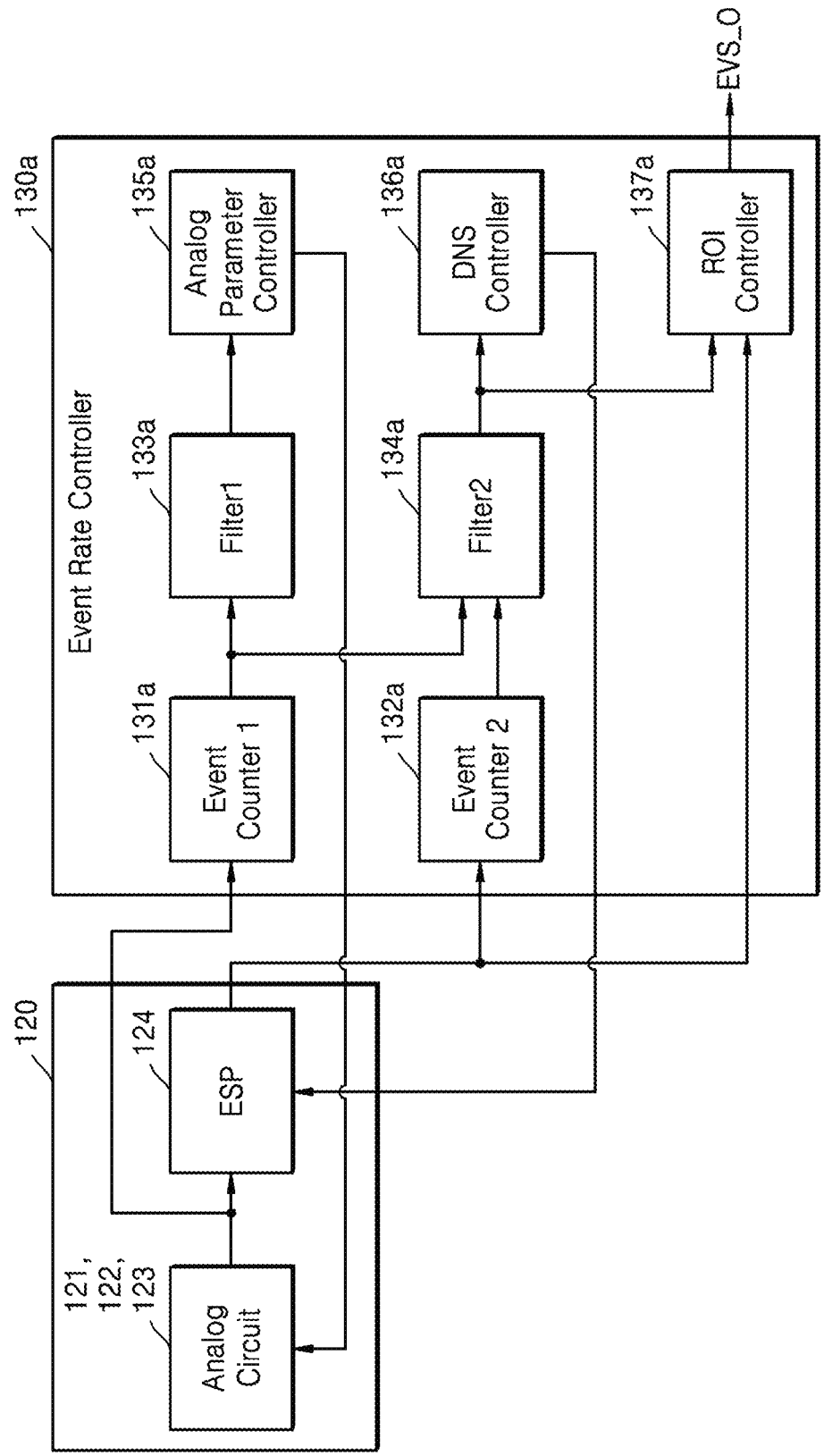

FIGS. 12A and 12B are block diagrams showing embodiments of the event rate controller 130 shown in FIG. 3.

Referring to FIG. 12A, the event rate controller 130 may include an event counter 131, an analog parameter controller 132, a de-noise (DNS) controller 133, and a ROI controller 134. Configurations of the event rate controller 130, that is, the event counter 131, the analog parameter controller 132, the DNS controller 133, and the ROI controller 134 may be realized as hardware or software. For example, the configurations of the event rate controller 130 may be realized as logic circuits. Alternatively, the configurations of the event rate controller 130 may be realized as instructions programmed to perform functions and a processor for executing the instructions.

The event counter 131 may count the event signals EVS output from the ESP unit 124 and output an amount of counted event signals, that is, the amount of event signals EVS that occurred.

When the amount of event signals EVS that occurred is equal to or greater than the reference value, the analog parameter controller 132 may adjust at least one setting parameter from among the analog circuit, that is, the row AER 121, the column AER 122, and the voltage generator 123. For example, the analog parameter controller 132 may control the voltage generator 123 (see FIG. 6) such that the voltage levels of the first threshold voltage TH1 and the second threshold voltage TH2 provided to the comparators (e.g., the first comparator 112 and the second comparator 113) (see FIG. 7) are used for detecting the on-event and the off-event from the pixel PX. The analog parameter controller 132 may change the register values set in the registers of the voltage generator 123 (see FIG. 6) related to the first threshold voltage TH1 and the second threshold voltage TH2 such that the first threshold voltage TH1 increases and the second threshold voltage TH2 decreases.

In some example embodiments, the first threshold voltage TH1 and the second threshold voltage TH2 may be differently set with respect to the ROI and the region out of the ROI on the pixel array 110 (see FIG. 3). In addition, when the plurality of ROIs are set, the first threshold voltage TH1 and the second threshold voltage TH2 may be differently set between the ROIs.

When the amount of event signals EVS that occurred is equal to or greater than the reference value, the DNS controller 133 may increase a de-noise threshold value. Accordingly, event signals EVS are not generated for the events that are determined as noises. Accordingly, the amount of event signals EVS that occurred may decrease.

In some example embodiments, the noise determination may be performed in pixel block unit, and the ROI controller 134 may differently set de-noise threshold values with respect to the ROI and the region out of ROI on the pixel array 110 (see FIG. 3). In addition, when the plurality of ROIs are set, the ROI controller 134 may differently set the first threshold value TH1 and the second threshold value TH2 between the ROIs.

When the amount of event signals EVS that occurred is equal to or greater than the reference value, the ROI controller 134 may output the event signals EVS corresponding to the ROI, from among the event signals EVS received from the ESP unit 124, as output event signals EVS_O. In some example embodiments, the plurality of ROIs are set, and when the amount of event signals EVS that occurred is equal to or greater than the first reference value and less than the second reference value, the ROI controller 134 may output event signals EVS corresponding to the plurality of ROIs. When the amount of event signals that occurred is equal to or greater than the second reference value, the ROI controller 134 may output event signals EVS corresponding to a smaller region, that is, the event signals EVS corresponding to the ROIs having higher importance.

Referring to FIG. 12B, the event rate controller 130a may include a first event counter 131a, a second event counter 132a, a first filter 133a, a second filter 134a, an analog parameter controller 135a, a DNS controller 136a, and a ROI controller 137a.

The first event counter 131a may count the events before the ESP unit 124 is used, that is, the event signals EVS before the de-noising, to output a first amount of event signals EVS that occurred. The second event counter 132a may count the events after the ESP unit 124 is used, that is, the event signals EVS after de-noising, to output a second amount of event signals EVS that occurred.

The first filter 133a may average or calculate the first amount of event signals EVS that occurred (e.g., are generated at the event detection circuit 120) in (e.g., during) a particular (or, alternatively, predetermined) time period unit. For example, the first filter 133a may average or calculate the first amount of event signals EVS that occurred, which is calculated at a time point t1, and the first amounts of event signals EVS that occurred which is calculated at earlier time points (for example, a time point t-1, a time point t-2, a time point t-3, and the like). For example, a weight is multiplied to each of the first amounts of event signals EVS that occurred that is calculated at various time points, and an average point of the values multiplied by the weights may be output as an amount of filtered event signals that occurred (e.g., are generated at the event detection circuit 120 during the particular time period unit). In this case, a smaller weight may be set as the amount of event signals EVS that occurred is calculated at a farther time point from present. Accordingly, rapid change in the first amount of event signals EVS that occurred may be removed.

Accordingly, it will be understood that the event rate controller 130 may apply (e.g., multiply) weights, which are assigned according to time points at which event signals are generated at the event detection circuit 120, respectively to amounts of event signals EVS that are generated and measured in a particular time period unit. The event rate controller 130 may then generate an amount of filtered event signals that are generated during the particular time period unit by averaging values to which the weights are applied. The event rate controller 130 may then set the operation mode of the vision sensor 100 based on the generated amount of filtered event signals that are generated at the event detection circuit 120 during the particular time period unit.

When a first amount of filtered event signals that occurred that is output from the first filter 133a is equal to or greater than the reference value, the analog parameter controller 135a may adjust at least one setting parameter from among the analog circuit, that is, the row AER 121, the column AER 122, and the voltage generator 123.

The second filter 134a averages and calculates an amount of event signal that occurred that is received from the ESP unit 124, that is, the amount of first event signal occurrence, and an amount of event signals that occurred indicating events before the ESP unit 124 is used, that is, the events before removing the noise, to generate a third amount of event signals EVS that occurred. Rapid change in the third amount of event signals EVS that occurred may be removed by averaging or calculating the third amount of event signals that occurred in a particular (or, alternatively, predetermined) time period unit.

When third amount of event signals that occurred that is output from the second filter 134a is equal to or greater than the reference value, the DNS controller 136a may increase the de-noise threshold value, and the ROI controller 137a may output the event signals EVS corresponding to the ROI, from among the event signals EVS received from the ESP unit 124, as the output event signals EVS_O. Alternatively, when the third amount of event signals that occurred is equal to or greater than the first reference value and less than the second reference value, the ROI controller 137a may output event signals EVS corresponding to the plurality of ROIs, and when the third amount of event signals that occurred is equal to or greater than the second reference value, the ROI controller 137a may output event signals EVS corresponding to a smaller region, that is, the event signals EVS corresponding to the ROI having high importance.

As described above, as the amounts of event signals that occurred, which is calculated in the event rate controller 130a, are filtered based on time, even when the amount of event signals that occurred increases or decreases, change in the amount of event signals that occurred may be applied in a delayed manner in adjusting the output of the event signals and the amount of event signals that occurred.

Figure 13:
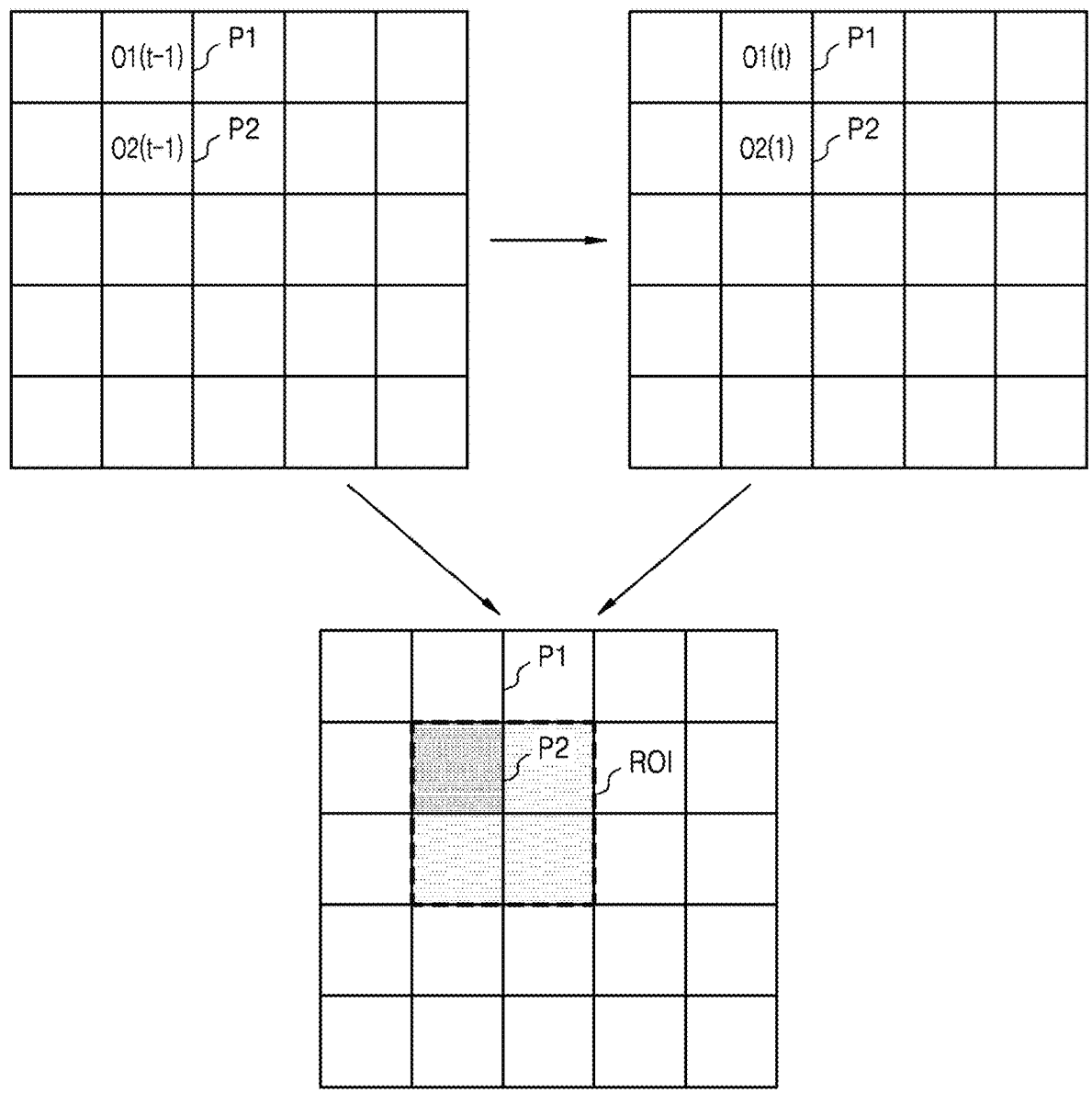
FIG. 13 shows an example of a method of setting an interest area of a vision sensor according to some example embodiments of the inventive concepts.

FIG. 13 shows an example of a method of setting the ROI of the vision sensor 100 according to some example embodiments of the inventive concepts.

Referring to FIG. 13, the ROI controller 137a (see FIG. 12B) may classify the pixel array 110 (see FIG. 3) into a plurality of patches, each separate patch including a separate set of one or more pixels of the plurality of pixels, and count event signals EVS corresponding to each of the patches (e.g., for each patch, count event signals EVS generated based on signals output from (e.g., events occurring at) any pixels PX in the patch as an amount of event signals EVS corresponding to the patch). When a plurality of events that occur in a specific patch (e.g., occur at any pixels PX in the specific patch) at least meets a threshold value, the ROI controller 137 may set the patch, or a region including the patch, as the ROI.

For example, when a difference between an amount of event signals that occurred O(t) of a first patch P1 counted at a time point t and an amount of event signals that occurred O1(t-1) of the first patch P1 that is counted at a previous time point, for example, a time point t-1, is equal to or greater than a threshold value set for distinguishing the ROI, the first patch P1 may be set as the ROI. When the difference between the amount of event signal that occurred O(t) of the first patch P1 counted at the time point t and the amount of event signals that occurred O(t-1) of the first patch P1 counted at a previous time point, for example, the time point t-1, is less than the threshold value set for distinguishing the ROI, the first patch P1 may not be set as the ROI.

When a difference between an amount of event signals O2 that occurred O2(t) of a second patch P2 counted at the time point t and an amount of event signals that occurred O2(t-1) of the second patch counted at the time point t-1 that is a previous time point is equal to or greater than the threshold value set for distinguishing the ROI, the second patch P2 or a region including the second patch P2 from among particular (or, alternatively, predetermined) regions may be set as the ROI.

Accordingly, the event rate controller 130 may count separate, respective amounts of event signals EVS corresponding to each patch of a plurality of patches, and the event rate controller 130 may further identify a patch corresponding to an amount of event signals EVS for which a change in amount (e.g., counted value) over a period of time is equal to or greater than a threshold value, as an ROI.

Figure 14:
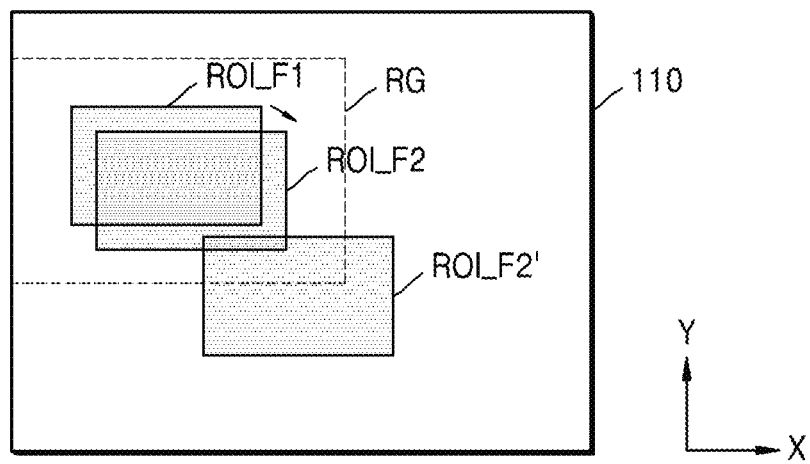
FIG. 14 shows a method of estimating a position of an interest area of a vision sensor according to some example embodiments of the inventive concepts.

FIG. 14 shows a method of estimating a position of ROI of the vision sensor 100 according to some example embodiments of the inventive concepts.

Referring to FIG. 14, the position of the ROI may be changed according to time, that is, frames. Each frame may be an image that includes an array of pixels that correspond to the array of pixels PX in the pixel array 110, where the signal (e.g., shade) of each pixel of the frame corresponds to a signal (or lack thereof) output by the corresponding pixel PX of the pixel array 110 during the period of time corresponding to the frame. The vision sensor 100 (see FIG. 3) may perform motion estimation to determine movements of the ROI, that is, the movements of the ROI in an X direction and/or a Y direction. For example, the vision sensor 100 may perform motion estimation to estimate the ROI of the second frame ROI_F2 based on the ROI of the first frame ROI_F1. In some example embodiments, the vision sensor 100 may perform motion estimation based on the event occurrence signal that is generated. Accordingly, the event rate controller 130 may perform motion estimation, on a first frame, based on a position of the ROI in the first frame ROI_F1 and may determine movement of the position of the ROI on a second frame ROI_F2 based on a result of the motion estimation. As another example, in an electronic product in which the image processing device 10 (see FIG. 1) is mounted, another sensor mounted adjacent the vision sensor 100, for example, a gyroscope sensor, may transmit a position sensing signal to the vision sensor 100, and the vision sensor 100 may perform motion estimation based on the position sensing signal.

When the ROI moves in a particular (or, alternatively, predetermined) range or farther, the vision sensor 100 may reset the ROI. For example, a range RG may be set based on the position of the ROI_F1 of the first frame, and when it is determined that a ROI_F2' of the second frame that is estimated exceeds the range RG, the vision sensor 100 may reset the ROIs.

For example, the vision sensor 100 may inform a user that the ROI moved out of a particular (or, alternatively, predetermined) range such that the user resets the ROI. In some example embodiments, as described above, the vision sensor 100 may reset the ROI based on the amounts of events that occurred.

Figure 15A:
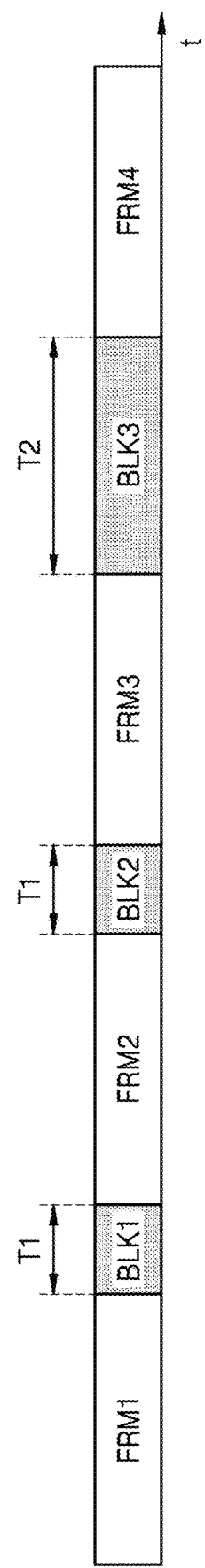
FIGS. 15A, 15B, and 15C show a method of adjusting a rate of event data output from the vision sensor according to some example embodiments.
Figure 15B:
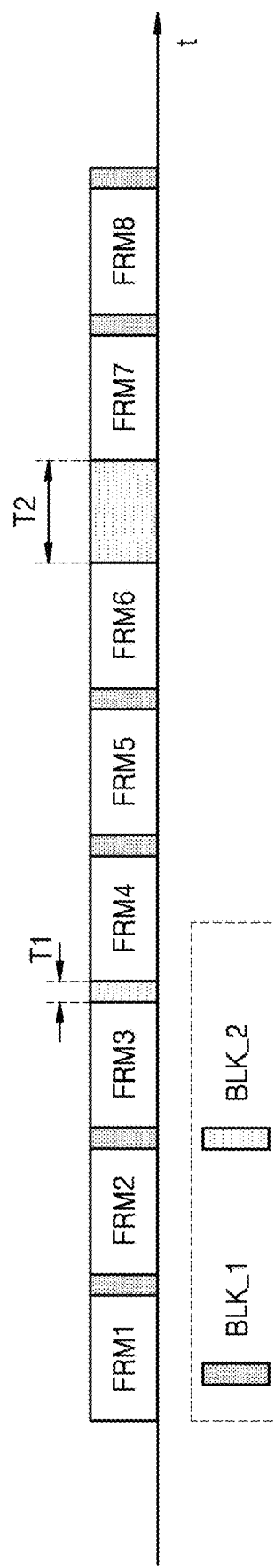
Figure 15C:
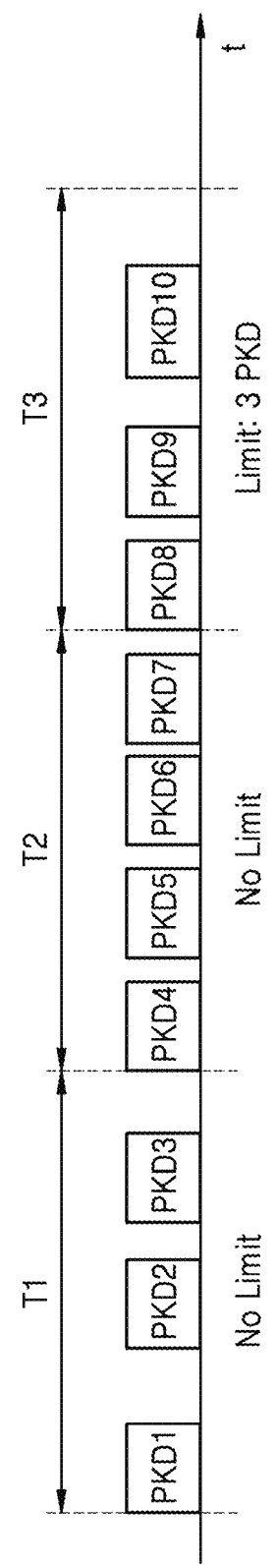

FIGS. 15A, 15B, and 15C show a method of adjusting a rate of event data output from the vision sensor 100.

Referring to FIGS. 15A and 15B, a plurality of frames FRM1 through FRM4 are output to the processor 200 as event data, and blank sections BLK1 through BLK3 may be between sections in which the plurality of frames FRM1 through FRM4 are transmitted. When the amount of event signals EVS that occurred is excessive, that is, when a measured amount of event signals EVS that occurred is equal or greater than the reference value, the vision sensor 100 may increase the blank sections to reduce an amount of transmitted event signals. Accordingly, the vision sensor 100 may transmit a plurality of frames FRM1 through FRM4 to the processor 200, and in response to operating in the second operating mode (wherein a limited selection of event signals of the plurality of event signals EVS are output as one or more output event signals EVS_O, where the limited selection of event signals correspond to one or more pixels PX included in an ROI of the pixel array 110), the vision sensor 100 may increase a length of a blank section between sections, in which the plurality of frames FRM1 through FRM4 are transmitted, to be longer than a length of the blank section between section between sections, in which the plurality of frames FRM1 through FRM4 are transmitted, when the vision sensor is operating in the first operation mode. In other words, the vision sensor 100 may reduce of a rate of event data that is transmitted (e.g., reduce a data transmission rate in the processor 200) when the vision sensor 100 is operating in the second operation mode.

Referring to FIG. 15A, when the amount of event signals EVS that occurred is less than the reference value, that is, before a third frame FRM3, a first blank section BLK1 and a second blank section BLK2 may be set as T1. When it is determined that the amount of event signals EVS that occurred is excessive in the third frame FRM3, the vision sensor 100 may set a third blank section BLK3 as T2 that is longer than T1. Accordingly, the amount of event signals EVS that occurred may decrease.

Referring to FIG. 15B, the blank sections may be classified into two types, for example, a first blank type BLK_1 and a second blank type BLK_2. The processor 200 (see FIG. 1) may use the plurality of frames, which are received from the vision sensor 100, in an overlapped manner. For example, the vision sensor 100 may merge the plurality of frames. A blank section between the frames used in the overlapped manner may be set as a first blank type BLK_1, and a blank section between the frames that do not overlap may be set as a second blank type BLK_2.

When the amount of event signals EVS that occurred is less than the reference value, a time period of the second blank type BLK_2 may be set to be identical or similar to a time period of the first blank type BLK_1. When the amount of event signals EVS that occurred is equal to or greater than the reference value, the time period of the second blank type BLK_2 may be set to be relatively longer than the time period of the first blank type BLK1.

For example, a first frame FRM1 through the third frame FRM3 may overlap, and a fourth frame FRM4 through a sixth frame FRM6 may be used in an overlapped manner. The vision sensor 100 may set blank sections between the first frame FRM1 through FRM3 and between the fourth frame FRM4 through the sixth frame FRM6 as the first blank type BLK_1; and the vision sensor 100 may set a blank section between the third frame FRM3 and the fourth frame FRM4 and a blank section between the sixth frame FRM6 and a seventh frame FRM7 as the second blank type BLK_2. The blank section between the third frame FRM3 and the fourth frame FRM4 is set as T1, and T1 may be identical or similar to the time period of the first blank type BLK_1. Next, when the amount of event signals EVS that occurred is determined to be equal to or greater than the reference value, the vision sensor 100 may increase the time period of the second blank type BLK_2 without changing the time period of the first blank type BLK_1. As it is shown, the vision sensor 100 may set the second blank type BLK_2, that is, a time period of the blank section between the sixth frame FRM6 and the seventh frame FRM7, as T2 that is relatively longer than T1.

Meanwhile, a maximum length of the blank sections in FIGS. 15A and 15B may be set based on a resolution of the pixel array 110 (FIG. 6). For example, the maximum length of the blank section may be set as within approximately 10 through 25% of a section in which the frames are transmitted.

Referring to FIG. 15C, data may be transmitted in packet unit, and when the amount of event signals EVS that occurred is excessive, the vision sensor 100 may reduce an amount of packet data transmitted during a particular (or, alternatively, predetermined) time period. For example, when the amount of event signals EVS that occurred is not excessive, the vision sensor 100 does not limit the amount of transmitted packet as in the first time period T1 and the second time period T2. A first packet PKD1 through a third packet PKD3 may be transmitted during the first time period T1, and a fourth packet PKD4 through a seventh packet PKD7 may be transmitted during the second time period T2.

However, when it is determined that the amount of packet transmitted during one period, for example, the third time period T3, is excessive, the amount of transmitted packet (or an amount of packet that is wasted without being transmitted) may be adjusted. The vision sensor 100 may select generated packets and output a limited number of packets. For example, the number of transmitted packet may be limited to three during the third time period T3, and accordingly, an eighth packet PKD8 through a tenth packet PKD10 may be transmitted during the third period T3.

When the amount of transmitted packet is limited, a maximum amount of the wasted packet may be set based on the resolution of the pixel array 110, for example, to be within from about 10% to about 25% of an amount of packet data generated during a particular (or, alternatively, predetermined) time period.

It will be understood that, when the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

Figure 16:
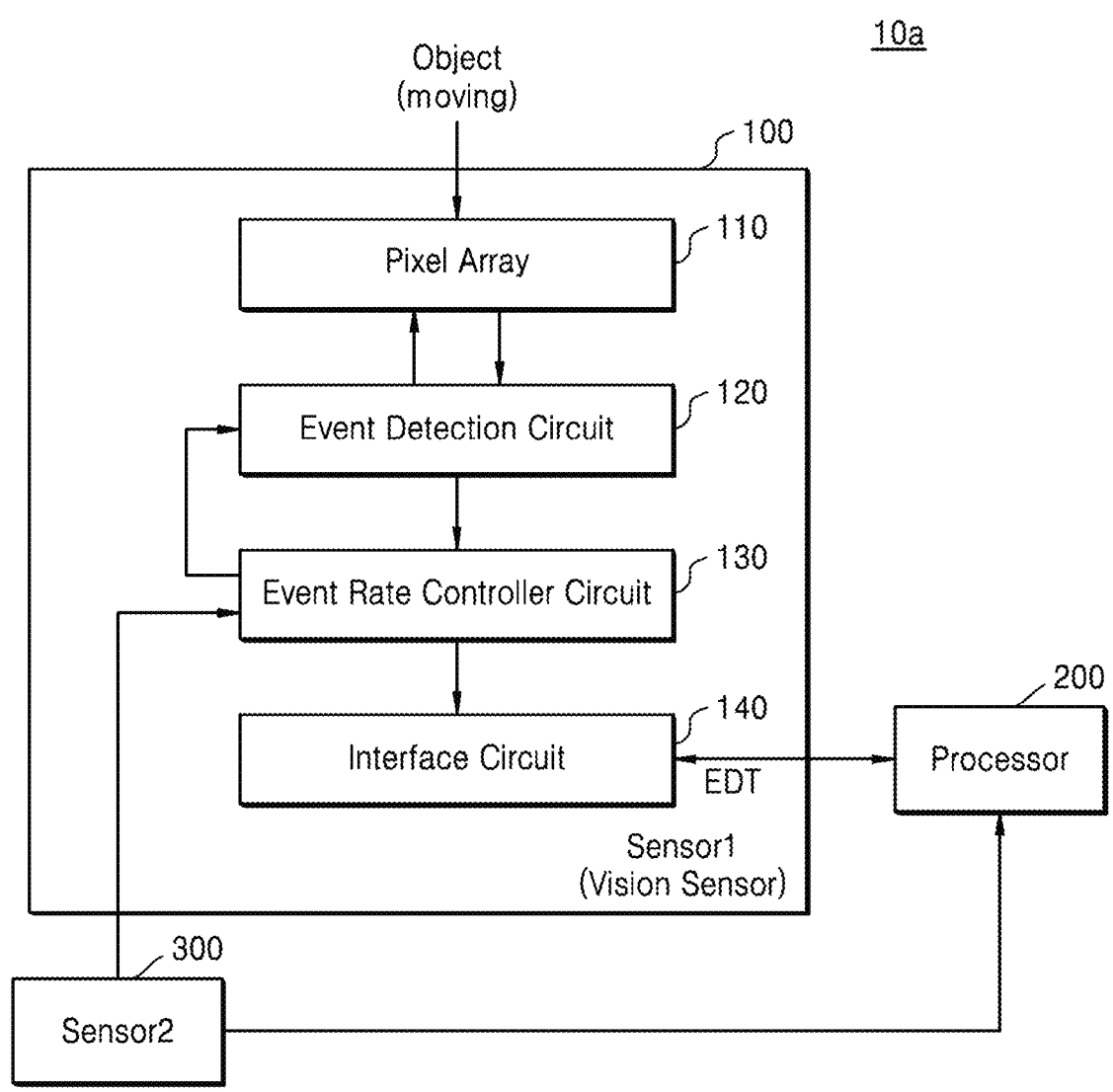
FIG. 16 is a block diagram of an image processing device according to some example embodiments of the inventive concepts.

FIG. 16 is a block diagram of an image processing device 10a according to some example embodiments of the inventive concepts.

Referring to FIG. 16, the image processing device 10a may include a first sensor, that is, the vision sensor 100, the processor 200, and a second sensor 300. For example, the second sensor 300 may detect an external environment when the image processing device 10a operates, for example, an illuminance around an object or a luminance of the object, or a position of the image processing device 10a. For example, the second sensor 300 may be a gyroscope sensor or an illuminance sensor.

The second sensor 300 may provide a sensed signal, through the processor 200 or directly, to the event rate controller 130 of the vision sensor 100. The vision sensor 100 may determine an operation mode of the vision sensor 100 based on the signal received from the second sensor 300. For example, the second sensor 300 may be an illuminance sensor, and illuminance information generated from the second sensor 300, which is the illuminance information indicating illuminance associated with an object or an external region including the object that is imaged by the vision sensor 100, may be provided to the event rate controller 130. The event rate controller 130 may determine, based on the illuminance information, whether a condition under which an excessive amount of events is expected has occurred. For example, when the illuminance information that is received may indicate an illuminance that is equal to or greater than a reference illuminance, the event rate controller 130 may expect that an amount of light at a periphery is high and an excessive amount of events may occur.

When an excessive amount of events is expected to occur, as described above, the event rate controller 130 may output event signals EVS corresponding to the region of interest ROI to reduce the amount of event signal output. In addition, the event rate controller 130 may change the event occurrence conditions or detection conditions to reduce a generation amount of event. In some example embodiments, the event rate controller 130 may set the event occurrence conditions or detection conditions set with respect to the ROI to be different from the event occurrence conditions or detection conditions set with respect to other regions.

The event rate controller 130 may variously change the operation mode based on the illuminance indicated by the illuminance information. For example, when the illuminance information indicates an illuminance that is equal to or greater than a reference illuminance, the event rate controller 130 may change the operation mode from the first operation mode, which is an operation mode set as a default, to a second operation mode. The event signals EVS corresponding to the ROI may be output in the second operation mode. In addition, the event rate controller 130 may change the event occurrence conditions or detection conditions in the second operation mode to reduce the amount of event that occurred. Accordingly, the vision sensor 100 may selectively operate in a selected operation mode of the first operation mode or the second operation mode based on whether an illuminance indicated by the illuminance information received from the illuminance sensor is equal to or greater than a reference illuminance.

Meanwhile, when the second sensor 300 is a gyroscope sensor, the event rate controller 130 may perform motion estimation based on a location signal provided from the gyro sensor, as described with reference to FIG. 14.

Figure 17:
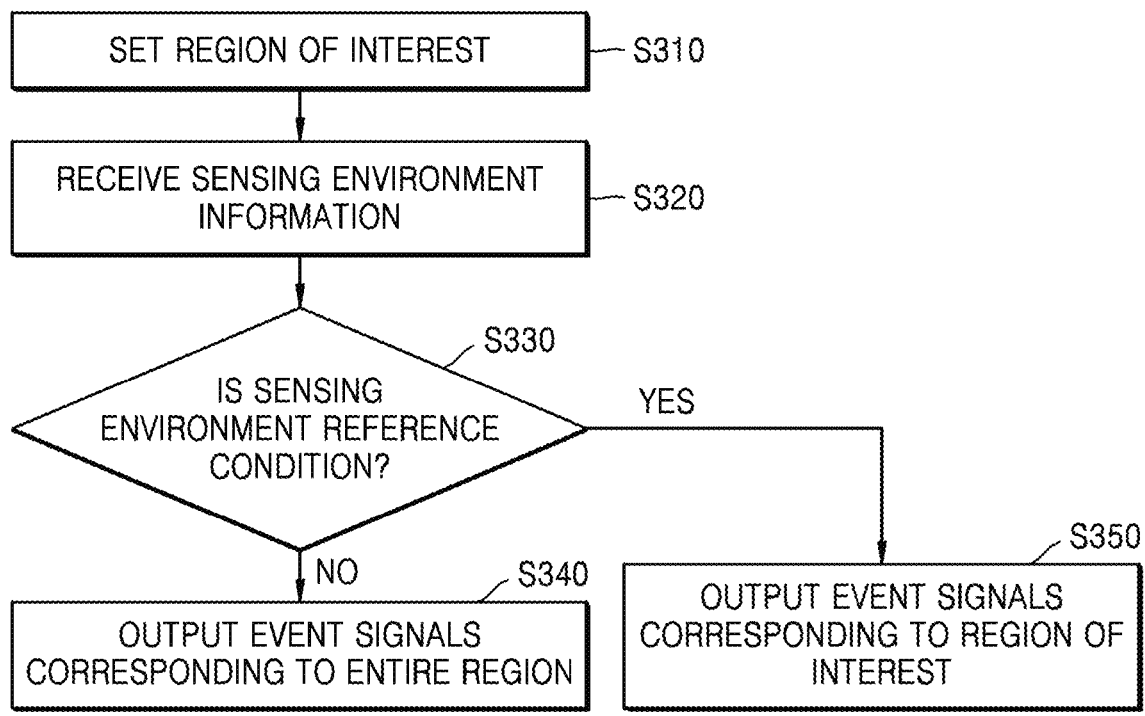
FIG. 17 is a flowchart showing an operating method of a vision sensor according to some example embodiments.

FIG. 17 is a flowchart showing an operating method of the vision sensor 100 according to some example embodiments of the inventive concepts. The operating method of FIG. 17 may be performed in the vision sensor 100 of FIG. 3, and more particularly, in the event rate controller 130.

Referring to FIGS. 3 and 17, the vision sensor 100 may set the ROI (S310). The vision sensor 100 may receive information regarding a sensing environment, for example, a peripheral environment (S320). For example, as described with reference to FIG. 16, the vision sensor 100 may receive peripheral illumination information from the illuminance sensor.

The vision sensor 100 may determine whether the sensing environment corresponds to the reference condition, based on the received sensing environment information (S330). The vision sensor 100 may determine whether the sensing environment is an occasion in which an excessive amount of events is expected. For example, when the illuminance information that is received is equal to or greater than the reference illuminance, the vision sensor 100 may expect that an amount of light around the vision sensor 100 is high and an excessive amount of events may occur.

When the sensing environment does not correspond to the reference condition, for example, the illuminance information is less than the reference illuminance, the vision sensor 100 may output the event signals EVS corresponding to the entire region (S340). When the sensing environment corresponds to the reference condition, the vision sensor 100 may output the event signals EVS corresponding to the ROI (S350).

The vision sensor 100 may set an operation mode based on the sensing environment. For example, when the sensing environment does not correspond to the reference condition, the vision sensor 100 may operate in a first operation mode in which the event signals EVS corresponding to the entire region are output; and when the sensing environment corresponds to the reference condition, the vision sensor 100 may operate in a second operation mode in which the event signals corresponding to the ROI from among the entire region may be output.

Figure 18:
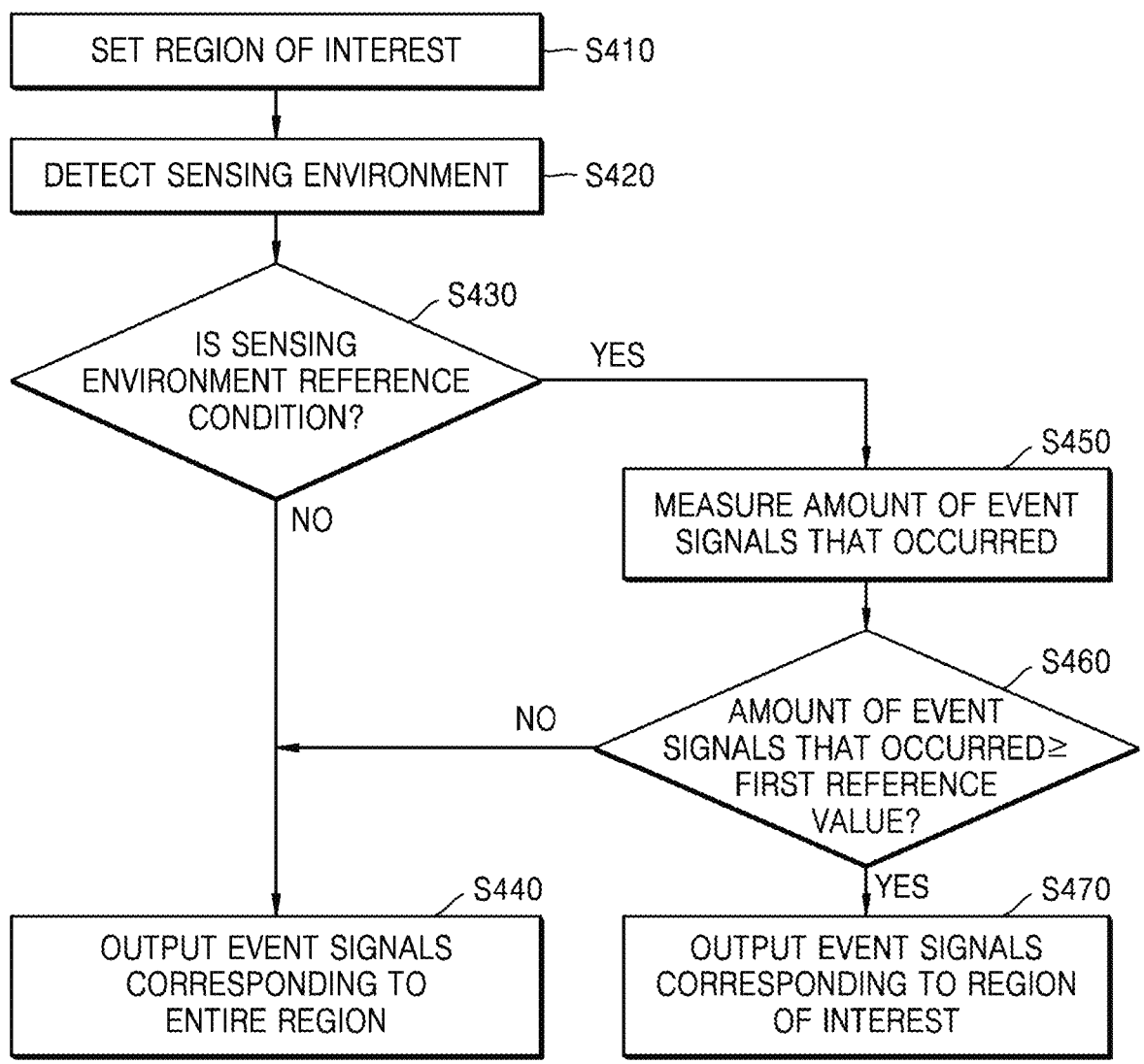
FIG. 18 is a flowchart showing an operating method of a vision sensor according to some example embodiments.

FIG. 18 is a flowchart showing an operating method of the vision sensor 100 according to some example embodiments of the inventive concepts. The operating method of FIG. 18 may be performed in the vision sensor 100 of FIG. 3, and more particularly, in the event rate controller 130.

Referring to FIGS. 3 and 18, the vision sensor 100 may set the ROI (S410). The vision sensor 100 may receive information regarding the sensing environment, for example, a peripheral environment (S420). The vision sensor 100 may determine whether the sensing environment corresponds to the reference condition, based on the sensing environment information that is received (S430). For example, the reference condition is a condition under which an excessive amount of events may occur. When the sensing environment does not correspond to the reference condition, the vision sensor 100 may output the event signals EVS corresponding to the entire region (S440).

When the sensing environment corresponds to the reference condition, the vision sensor 100 may measure the amount of event signals EVS that occurred (S450). For example, the vision sensor 100 compares the amount of event signals EVS that occurred with the reference value (S460). When the amount of event signals EVS that occurred is less than the reference value, the event signals EVS corresponding to the entire region are output (S440), and when the amount of event signals that occurred is equal to or greater than the reference value, the vision sensor 100 may output the event signals EVS corresponding to the ROI (S470).

As described above, when the excessive amount of event signals EVS is expected such as cases when a peripheral illuminance is high or the luminance of the object is high, the vision sensor 100 may measure the amount of event signal EVS that occurred, and when the event signal EVS equal to or greater than the reference value occurs, the vision sensor 100 output the event signals EVS corresponding to the ROI to reduce the amount of event data delivered to the processor 200 (See FIG. 1).

Figure 19:
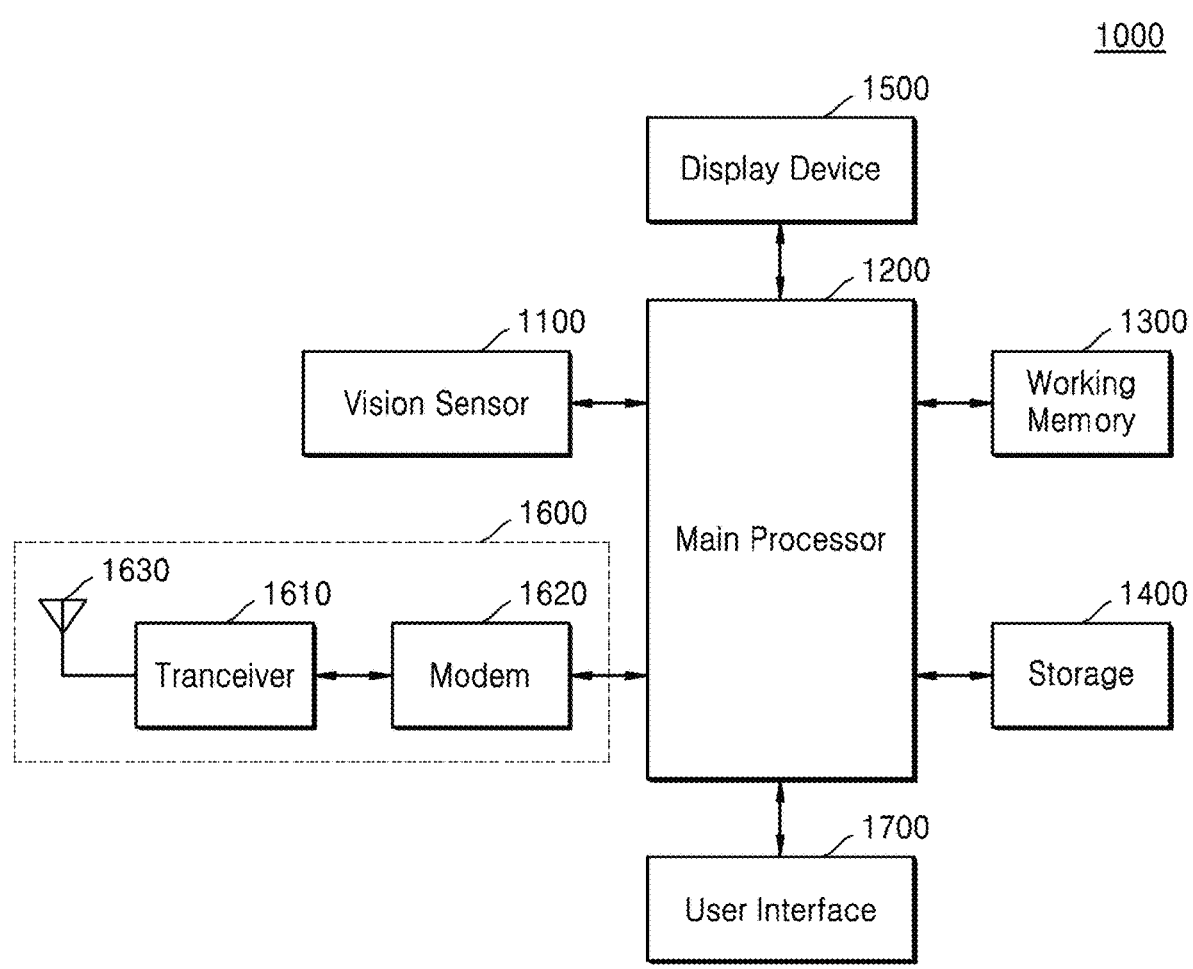
FIG. 19 is a block diagram showing an example of an electronic device which adopts a vision sensor according to some example embodiments of the inventive concepts.

FIG. 19 is a block diagram showing an example of an electronic device which adopts the vision sensor 100 according to some example embodiments of the inventive concepts.

Referring to FIG. 19, the electronic device 1000 may include a vision sensor 1100, a main processor 1200, a working memory 1300, a storage 1400, a display device 1500, a communication unit 1600, and a user interface 1700.

The vision sensor 100 described with reference to FIGS. 1 through 18 may be adopted as the vision sensor 1100. The vision sensor 1100 may sense the object to generate the event signals EVS and transmit the generated event signals EVS to the main processor 1200. When the sensing environment, for example, the peripheral environment including the object, corresponds to a condition under which an excessive amount of event signals is expected to occur or when the amount of event signal EVS that occurred that is measured is equal to or greater than the reference value, the vision sensor 1100 may selectively transmit the event signals corresponding to the ROI, from among the generated event signals, to the main processor 1200. Accordingly, an amount of transmitted event signals, that is, an amount of event data, may be reduced or maintained at or under a certain level. Therefore, data loss during a process of transmitting the event signals EVS may be reduced or prevented.

In addition, when the amount of event signals EVS that occurred is determined to be equal to or greater than the reference value, the event occurrence conditions and/or detection conditions may be adjusted to reduce the amount of event signals EVS that are generated. In some example embodiments, the event occurrence conditions and/or detection conditions may be variously set in the ROI and the region except the ROI and also be variously set in the plurality of ROIs.

The main processor 1200 may control all operations of the electronic device 1000 and process the event data received from the vision sensor 1100, that is, the event signals EVS, to detect the movement of the object.

The working memory 1300 may store data used for operation of the electronic device 1000. For example, the working memory 1300 may temporarily store packets or frames processed by the main processor 1200. For example, the working memory 1300 may include a volatile memory such as dynamic RAM (DRAM), synchronous RAM (SDRAM) and a non-volatile memory such as phase-change RAM (PRAM), magneto-resistive RAM (MRAM), resistive RAM (ReRAM), and ferroelectric RAM (FRAM).

The storage 1400 may store data that is requested to be stored from the main processor 1200 or other configurations. The storage 1400 may include a flash memory and a non-volatile memory such as PRAM, MRAM, ReRAM, and FRAM.

The display device 1500 may include a display panel, a display driving circuit, and a display serial interface (DSI). For example, the display panel may be realized as various devices such as a liquid crystal display (LCD) apparatus, a light emitting diode display (LED) apparatus, an organic LED (OLED) apparatus, and active matrix OLED apparatus. The display driving circuit may include a timing controller, a source driver, and the like for driving the display panel. A DSI host embedded in the main processor 1200 may perform serial communication with the display panel through the DSI.

The communication unit 1600 may exchange signals with an external apparatus/system through an antenna 1630. A transceiver 1610 and a modem 1620 (modulator/demodulator) may process signals exchanged between the communication unit 1600 and the external apparatus/system according to wireless communication protocols such as Long Term Evolution (LTE), WIMAX (Worldwide Interoperability for Microwave Access), GSM (Global System for Mobile communication), CDMA (Code Division Multiple Access), Bluetooth, NFC (Near Field Communication), Wi-Fi (Wireless Fidelity), and RFID (Radio Frequency Identification).

The user interface 1700 may include at least one of input interfaces such as a keyboard, a mouse, a keypad, a button, a touch panel, a touch screen, a touch pad, a touch ball, a gyroscope sensor, as vibration sensor, and an acceleration sensor.

Components of the electronic device 1000, for example, the vision sensor 1100, the main processor 1200, the working memory 1300, the storage 1400, the display device 1500, the communication unit 1600, and the user interface 1700 may exchange data based on one or more of various interface protocols such as Universal Serial Bus (USB), Small Computer System Interface (SCSI), MIPI, I2C, Peripheral Component Interconnect Express (PCIe), Mobile PCIe (M-PCIe), Advanced Technology Attachment (ATA), Parallel ATA (PATA), Serial ATA (SATA), Serial Attached SCSI (SAS), Integrated Drive Electronics (IDE), Enhanced IDE (EIDE), Nonvolatile Memory Express (NVMe), Universal Flash Storage (UFS).

While the inventive concepts has been particularly shown and described with reference to embodiments thereof, it will be understood that various changes in form and details may be made therein without departing from the spirit and scope of the following claims.

What is claimed is:

1. A dynamic vision sensor, comprising:
a pixel array comprising a plurality of pixels arranged in a matrix, each pixel configured to generate one or more electrical signals in response to a change in intensity of incident light;
an event detection circuit configured to process electrical signals received from the pixel array, and generate event signals, each event signal of the event signals including a polarity and an address corresponding to a separate electrical signal of the electrical signals;
an event rate controller configured to count the event signals and transmit some of the event signals as output event signals in response to a count value of the event signals being equal to or greater than a reference value; and
an interface circuit configured to output the output event signals to an external device,
wherein the event detection circuit includes an address event representation to generate the address.

2. The dynamic vision sensor of claim 1, wherein the event rate controller is configured to transmit all of the event signals as the output event signals in response to the count value being less than the reference value.

3. The dynamic vision sensor of claim 2, wherein the event rate controller is configured to count the event signals during a particular time unit.

4. The dynamic vision sensor of claim 1, wherein an amount of the output event signals does not exceed a transmission limit between the dynamic vision sensor and the external device.

5. The dynamic vision sensor of claim 1, wherein the address event representation includes a row address event representation and a column address event representation generating a row address and a column address, respectively and wherein the address includes a row address and a column address.

6. The dynamic vision sensor of claim 1, wherein the event rate controller is further configured to not to transmit other event signals except the output event signals from the event signals.

7. The dynamic vision sensor of claim 1, wherein a format of the output event signals outputted from the interface circuit is in a packet unit.

8. The dynamic vision sensor of claim 1, wherein a format of the output event signals outputted from the interface circuit is a frame unit including a plurality of packets.

9. The dynamic vision sensor of claim 7, wherein the packet unit includes the address and the polarity and a time stamp indicating when the separate electrical signal is generated.

10. The dynamic vision sensor of claim 1, wherein the pixel array is scanned in row units or in column units.

11. The dynamic vision sensor of claim 1, wherein the event detection circuit further configured to determine some of the electrical signals as a noise event and not to generate event signals corresponding to the some of the electrical signals.

12. The dynamic vision sensor of claim 1, wherein each pixel of the plurality of pixels comprises:
a boosting circuit including a first transistor and a second transistor; and
a photodiode connected to a first node of the first transistor,
wherein a gate node of the first transistor is connected to a first node of the second transistor, a gate node of the second transistor is connected to a second node of the first transistor and a second node of the second transistor is connected to an output node.

13. The dynamic vision sensor of claim 12, wherein each pixel of the plurality of pixels further comprises a converter transistor, a first node of the converter transistor being connected to the gate node of the second transistor and a gate node of the converter transistor being connected to the output node.

14. The dynamic vision sensor of claim 13, wherein each pixel of the plurality of pixels further comprises an amplification transistor, a gate node of the amplification transistor being connected to the first node of the first transistor and a first node of the amplification transistor being connected to the gate node of the first transistor.

15. The dynamic vision sensor of claim 1, wherein the vision sensor is configured to transmit the event signals to the external device non-periodically or periodically.

16. An image processing device, comprising:
a processor; and
a dynamic vision sensor configured to transmit an output event signals to the processor,
wherein the dynamic vision sensor includes,
- a pixel array comprising a plurality of pixels arranged in a matrix, each pixel configured to generate one or more electrical signals in response to a change in intensity of incident light,
- an event detection circuit configured to process electrical signals received from the pixel array, and generate event signals, each event signal including a polarity and an address corresponding to a separate electrical signal of the electrical signals,
- an event rate controller configured to count the event signals and transmit some of the event signals as the output event signals in response to a count value of the event signals being equal to or greater than a reference value, and
- an interface circuit configured to output the output event signals to the processor, and wherein the event detection circuit includes an address event representation to generate the address.

17. The image processing device of claim 16, wherein the event rate controller configured to transmit all of the event signals as the output event signals in response to the count value being less than the reference value.

18. The image processing device of claim 16, wherein an amount of the output event signals is equal to or less than a transmission limit between the dynamic vision sensor and the processor.

19. The image processing device of claim 16, wherein a format of the output event signals outputted from the dynamic vision sensor is in a packet unit or a frame unit.

20. The image processing device of claim 16, further comprising an image sensor configured to transmit signals to the processor, and the processor is configured to generate an image by processing the output event signals from the dynamic vision sensor and the signals from the image sensor.

* * * * *